US012687668B2

(12) United States Patent
Singh et al.

(10) Patent No.: US 12,687,668 B2
(45) Date of Patent: Jul. 21, 2026

(54) ULTRASONICATION NANO-GEOMETRY CONTROL PROCESS AND METHODS

(71) Applicant: Magic Leap, Inc., Plantation, FL (US)

(72) Inventors: Vikramjit Singh, Pflugerville, TX (US); Lorenzo Mcdonald, Pflugerville, TX (US); Frank Y. Xu, Austin, TX (US)

(73) Assignee: Magic Leap, Inc., Plantation, FL (US)

( * ) Notice: Subject to any disclaimer, the term of this patent is extended or adjusted under 35 U.S.C. 154(b) by 288 days.

(21) Appl. No.: 18/555,445

(22) PCT Filed: Apr. 19, 2022

(86) PCT No.: PCT/US2022/071803
§ 371 (c)(1),
(2) Date: Oct. 13, 2023

(87) PCT Pub. No.: WO2022/226497
PCT Pub. Date: Oct. 27, 2022

(65) Prior Publication Data
US 2025/0284041 A1 Sep. 11, 2025

Related U.S. Application Data

(60) Provisional application No. 63/177,294, filed on Apr. 20, 2021.

(51) Int. Cl.
*G02B 5/18* (2006.01)
*B82Y 20/00* (2011.01)
(Continued)

(52) U.S. Cl.
CPC ............ *G02B 5/1857* (2013.01); *B82Y 20/00* (2013.01); *B82Y 40/00* (2013.01); *G02B 1/02* (2013.01);
(Continued)

(58) Field of Classification Search
CPC ...... G02B 5/1857; G02B 5/1847; G02B 1/02; G02B 5/1809; G02B 5/1814;
(Continued)

(56) References Cited

U.S. PATENT DOCUMENTS

| | | | |
|---|---|---|---|
| 4,852,988 A | 8/1989 | Velez | |
| 5,919,607 A | 7/1999 | Lawandy | |

(Continued)

FOREIGN PATENT DOCUMENTS

| | | | |
|---|---|---|---|
| CA | 2316473 A1 | 1/2001 | |
| CA | 2362895 A1 | 12/2002 | |

(Continued)

OTHER PUBLICATIONS

Jacob, R. "Eye Tracking in Advanced Interface Design", Virtual Environments and Advanced Interface Design, Oxford University Press, Inc. (Jun. 1995).

(Continued)

*Primary Examiner* — Jonathan Y Jung
(74) *Attorney, Agent, or Firm* — Zi Y. Wong; Via LLP

(57) ABSTRACT

Disclosed herein are systems and methods for fabricating nanostructures on a substrate that can be used in eyepieces for displays, e.g., in head wearable devices. Fabricating and/or etching such a substrate can include submerging the substrate in a bath and applying ultrasonication to the bath for a first time period. The ultrasonication applied to the first bath can agitate the fluid to provide a substantially uniform first reactive environment across the surface of the substrate. The substrate can be submerged in a second bath and ultrasonication can be applied to the second bath for a second time period. The ultrasonication applied to the second bath can agitate the fluid to provide a substantially uniform second reactive environment across the surface of the substrate. A predetermined amount of material can be (Continued)

removed from the surface of the substrate during the second time period to produce an etched substrate.

18 Claims, 18 Drawing Sheets

(51) Int. Cl.

| | |
|---|---|
| *B82Y 40/00* | (2011.01) |
| *G02B 1/02* | (2006.01) |
| *G02B 27/01* | (2006.01) |
| *G02B 25/00* | (2006.01) |

(52) U.S. Cl.
CPC ......... *G02B 5/1809* (2013.01); *G02B 5/1814* (2013.01); *G02B 25/001* (2013.01); *G02B 27/0172* (2013.01); *G02B 2027/0178* (2013.01)

(58) Field of Classification Search
CPC .... G02B 2027/0174; G02B 2027/0178; G02B 25/001; G02B 27/0172; B82Y 40/00
See application file for complete search history.

(56) References Cited

U.S. PATENT DOCUMENTS

| | | | |
|---|---|---|---|
| 6,433,760 | B1 | 8/2002 | Vaissie |
| 6,491,391 | B1 | 12/2002 | Blum et al. |
| 6,767,840 | B1 | 7/2004 | Uehara |
| 6,847,336 | B1 | 1/2005 | Lemelson |
| 6,943,754 | B2 | 9/2005 | Aughey |
| 6,977,776 | B2 | 12/2005 | Volkenandt et al. |
| 7,090,783 | B1* | 8/2006 | Cui .................... B81C 1/00031 |
| | | | 430/311 |
| 7,347,551 | B2 | 3/2008 | Fergason et al. |
| 7,488,294 | B2 | 2/2009 | Torch |
| 8,235,529 | B1 | 8/2012 | Raffle |
| 8,611,015 | B2 | 12/2013 | Wheeler |
| 8,638,498 | B2 | 1/2014 | Bohn et al. |
| 8,696,113 | B2 | 4/2014 | Lewis |
| 8,929,589 | B2 | 1/2015 | Publicover et al. |
| 9,010,929 | B2 | 4/2015 | Lewis |
| 9,274,338 | B2 | 3/2016 | Robbins et al. |
| 9,292,973 | B2 | 3/2016 | Bar-Zeev et al. |
| 9,323,325 | B2 | 4/2016 | Perez et al. |
| 9,720,505 | B2 | 8/2017 | Gribetz et al. |
| 10,013,053 | B2 | 7/2018 | Cederlund et al. |

| | | | |
|---|---|---|---|
| 10,025,379 | B2 | 7/2018 | Drake et al. |
| 2003/0030597 | A1 | 2/2003 | Geist |
| 2006/0023158 | A1 | 2/2006 | Howell et al. |
| 2008/0095816 | A1 | 4/2008 | Gordy et al. |
| 2009/0236317 | A1 | 9/2009 | Yost et al. |
| 2011/0211056 | A1 | 9/2011 | Publicover et al. |
| 2011/0213664 | A1 | 9/2011 | Osterhout |
| 2012/0021806 | A1 | 1/2012 | Maltz |
| 2013/0077147 | A1 | 3/2013 | Efimov |
| 2014/0167257 | A1 | 6/2014 | Mujeeb-u-rahman et al. |
| 2014/0195918 | A1 | 7/2014 | Friedlander |
| 2015/0168731 | A1 | 6/2015 | Robbins |
| 2015/0340320 | A1 | 11/2015 | Sapra |
| 2016/0318011 | A1* | 11/2016 | Hosseinifar .............. B01J 37/16 |
| 2019/0322020 | A1* | 10/2019 | Andoh .................... B32B 15/20 |
| 2019/0366381 | A1* | 12/2019 | Brockway ............... B05D 5/02 |
| 2020/0157693 | A1 | 5/2020 | Abel |
| 2020/0319382 | A1* | 10/2020 | Guo ....................... G02B 1/002 |
| 2022/0404525 | A1* | 12/2022 | Wolk ..................... G02B 1/002 |

FOREIGN PATENT DOCUMENTS

| | | |
|---|---|---|
| CA | 2388766 A1 | 12/2003 |
| CN | 102981198 A | 3/2013 |
| CN | 105088304 A | 11/2015 |
| JP | 2008235774 | 10/2008 |
| JP | 2020150126 | 9/2020 |
| TW | 202014374 A | 4/2020 |
| WO | 2020235225 | 11/2020 |

OTHER PUBLICATIONS

Rolland, J. et al., "High-resolution inset head- mounted display", Optical Society of America, vol. 37, No. 19, Applied Optics, (Jul. 1, 1998).

Tanriverdi, V. et al. (Apr. 2000). "Interacting With Eye Movements in Virtual Environments," Department of Electrical Engineering and Computer Science, Tufts University, Medford, MA 02155, USA, Proceedings of the SIGCHI conference on Human Factors in Computing Systems, eight pages.

Yoshida, A. et al., "Design and Applications of a High Resolution Insert Head Mounted Display", (Jun. 1994).

Extended European Search Report dated Feb. 10, 2025, for EP Application No. 22792687.0, eight pages.

International Preliminary Report and Written Opinion mailed Nov. 2, 2023, for PCT Application No. PCT/US2022/071803, nine pages.

* cited by examiner

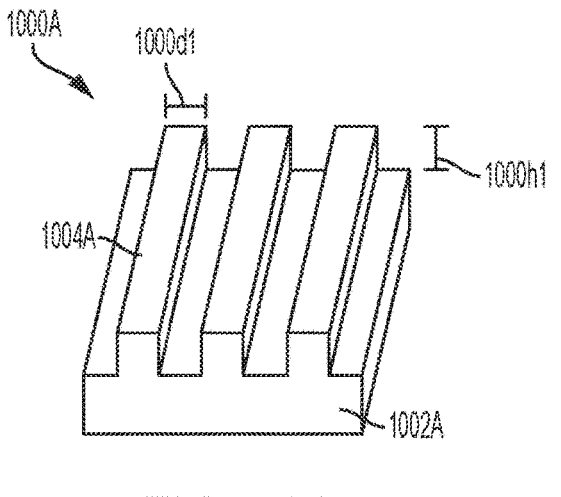
FIG. 10A                    FIG. 10B

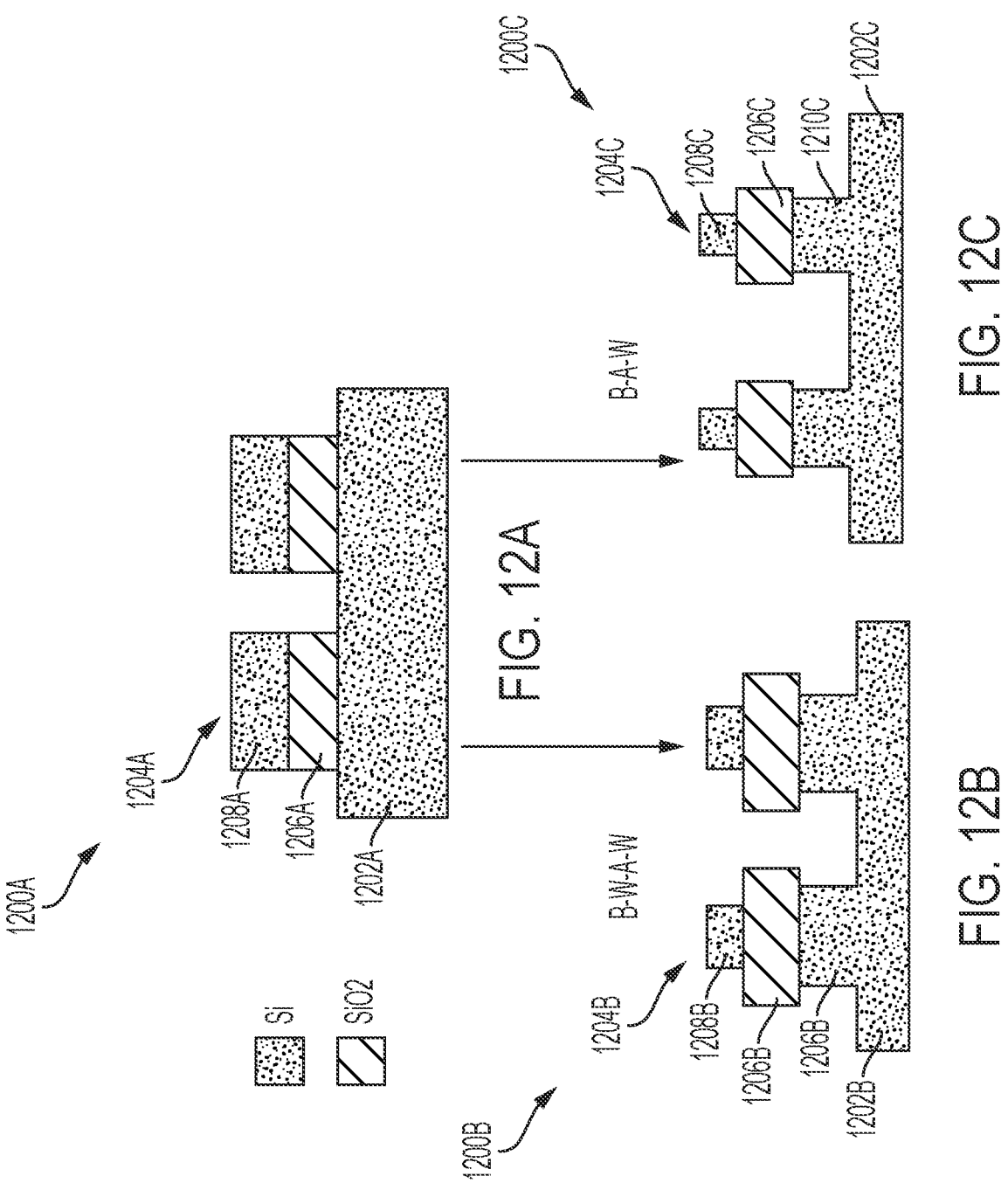

1400

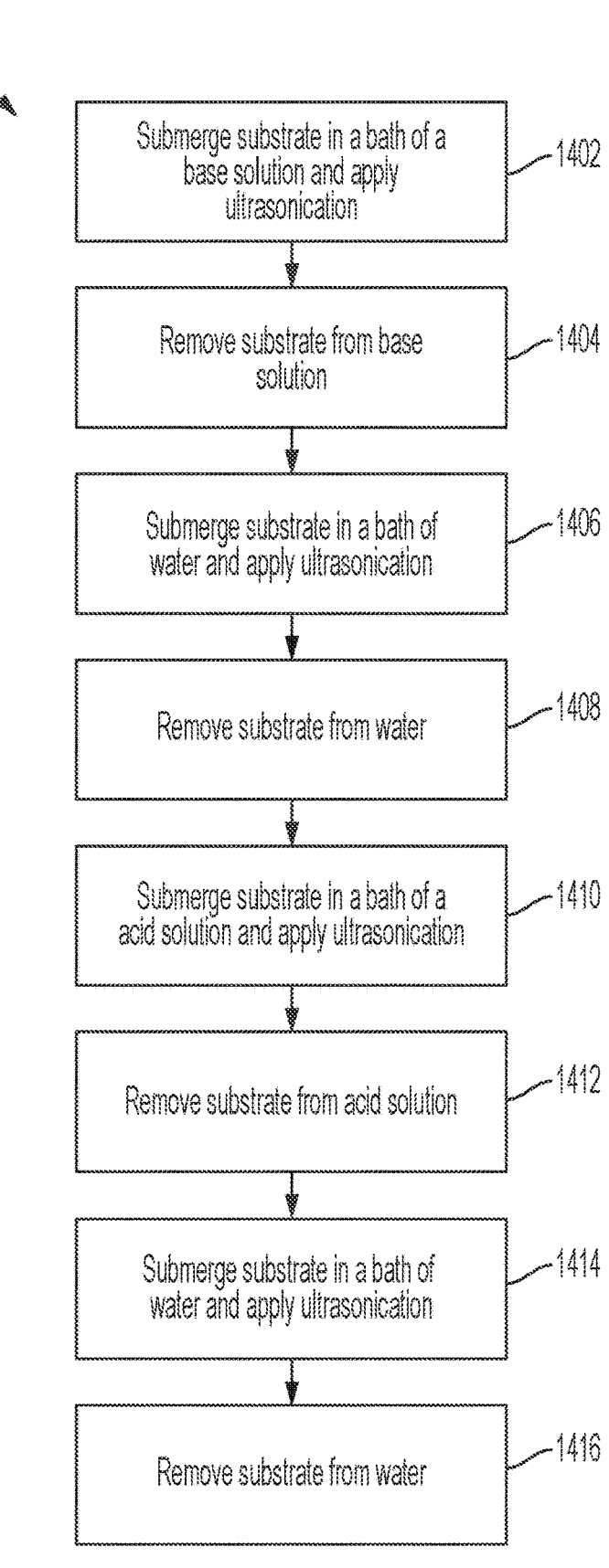

Submerge substrate in a bath of a base solution and apply ultrasonication — 1402

Remove substrate from base solution — 1404

Submerge substrate in a bath of water and apply ultrasonication — 1406

Remove substrate from water — 1408

Submerge substrate in a bath of a acid solution and apply ultrasonication — 1410

Remove substrate from acid solution — 1412

Submerge substrate in a bath of water and apply ultrasonication — 1414

Remove substrate from water — 1416

FIG. 14

ULTRASONICATION NANO-GEOMETRY CONTROL PROCESS AND METHODS

CROSS-REFERENCE TO RELATED APPLICATIONS

This application is a national stage application under 35 U.S.C. § 371 of International Application No. PCT/US2022/71803, filed internationally on Apr. 19, 2022, which claims priority to U.S. Provisional Application No. 63/177,294, filed on Apr. 20, 2021, the contents of which are incorporated by reference herein in their entirety.

FIELD

This disclosure relates in general to systems and methods for displaying visual information, and in particular to eyepieces for displaying visual information in an augmented reality or mixed reality environment. More specifically, this disclosure relates to systems and methods for fabricating gratings used in eyepieces for displaying visual information in an augmented reality or mixed reality environment.

BACKGROUND

Virtual environments are ubiquitous in computing environments, finding use in video games (in which a virtual environment may represent a game world); maps (in which a virtual environment may represent terrain to be navigated); simulations (in which a virtual environment may simulate a real environment); digital storytelling (in which virtual characters may interact with each other in a virtual environment); and many other applications. Modern computer users are generally comfortable perceiving, and interacting with, virtual environments. However, users' experiences with virtual environments can be limited by the technology for presenting virtual environments. For example, conventional displays (e.g., 2D display screens) and audio systems (e.g., fixed speakers) may be unable to realize a virtual environment in ways that create a compelling, realistic, and immersive experience.

Virtual reality ("VR"), augmented reality ("AR"), mixed reality ("MR"), and related technologies (collectively, "XR") share an ability to present, to a user of an XR system, sensory information corresponding to a virtual environment represented by data in a computer system. This disclosure contemplates a distinction between VR, AR, and MR systems (although some systems may be categorized as VR in one aspect (e.g., a visual aspect), and simultaneously categorized as AR or MR in another aspect (e.g., an audio aspect)). As used herein, VR systems present a virtual environment that replaces a user's real environment in at least one aspect; for example, a VR system could present the user with a view of the virtual environment while simultaneously obscuring his or her view of the real environment, such as with a light-blocking head-mounted display. Similarly, a VR system could present the user with audio corresponding to the virtual environment, while simultaneously blocking (attenuating) audio from the real environment.

VR systems may experience various drawbacks that result from replacing a user's real environment with a virtual environment. One drawback is a feeling of motion sickness that can arise when a user's field of view in a virtual environment no longer corresponds to the state of his or her inner ear, which detects one's balance and orientation in the real environment (not a virtual environment). Similarly, users may experience disorientation in VR environments where their own bodies and limbs (views of which users rely on to feel "grounded" in the real environment) are not directly visible. Another drawback is the computational burden (e.g., storage, processing power) placed on VR systems, which must present a full 3D virtual environment, particularly in real-time applications that seek to immerse the user in the virtual environment. Similarly, such environments may need to reach a very high standard of realism to be considered immersive, as users tend to be sensitive to even minor imperfections in virtual environments-any of which can destroy a user's sense of immersion in the virtual environment. Further, another drawback of VR systems is that such applications of systems cannot take advantage of the wide range of sensory data in the real environment, such as the various sights and sounds that one experiences in the real world. A related drawback is that VR systems may struggle to create shared environments in which multiple users can interact, as users that share a physical space in the real environment may not be able to directly see or interact with each other in a virtual environment.

As used herein, AR systems present a virtual environment that overlaps or overlays the real environment in at least one aspect. For example, an AR system could present the user with a view of a virtual environment overlaid on the user's view of the real environment, such as with a transmissible head-mounted display that presents a displayed image while allowing light to pass through the display into the user's eye. Similarly, an AR system could present the user with audio corresponding to the virtual environment, while simultaneously mixing in audio from the real environment. Similarly, as used herein, MR systems present a virtual environment that overlaps or overlays the real environment in at least one aspect, as do AR systems, and may additionally allow that a virtual environment in an MR system may interact with the real environment in at least one aspect. For example, a virtual character in a virtual environment may toggle a light switch in the real environment, causing a corresponding light bulb in the real environment to turn on or off. As another example, the virtual character may react (such as with a facial expression) to audio signals in the real environment. By maintaining presentation of the real environment, AR and MR systems may avoid some of the aforementioned drawbacks of VR systems; for instance, motion sickness in users is reduced because visual cues from the real environment (including users' own bodies) can remain visible, and such systems need not present a user with a fully realized 3D environment in order to be immersive. Further, AR and MR systems can take advantage of real world sensory input (e.g., views and sounds of scenery, objects, and other users) to create new applications that augment that input.

Presenting a virtual environment in a realistic manner to create an immersive experience for the user in a robust and cost effective manner can be difficult. For example, a head mounted display can include an optical system having one or more multi-layered eyepieces, which can be an expensive and fragile component. For example, each layer may be manufactured via a complicated process that includes multiple steps to achieve diffractive gratings and associated films to effectively project a digital image to the user. The diffractive gratings, for example, may include multi-tiered structures formed on a nano-scale. These multi-tiered structures can be manufactured using lithography processes, but such processes can be expensive and achieving the desired geometry can be difficult on the nano-scale. For example, fabricating nano-structures that are less than 50 nm with high fidelity (no line breaks, smooth line edges) may use expensive lithography techniques, such as E-beam lithography, to achieve the desired nano-structure resolution. Even with such lithography techniques, aligning components to produce lithography masters and/or a final product at the nanometer scale can be difficult and the resulting nano-structure can be prone to uneven line edge roughness (LER). Thus, there exists a need for an inexpensive process for manufacturing multi-tiered nano-scale structures.

In order to address the issues associated with expensive lithography techniques used to fabricate nano-structures, systems and methods according to embodiments of this disclosure rely on an ultrasonication process to etch and form the desired nano-structures on a substrate. For example, embodiments according to this disclosure may use an ultrasonication sequence process to achieve desired etch selectivity of the different material layers deposited on a substrate. The ultrasonication sequence process can include submerging a substrate in a bath of a base solution, acid solution, and/or water and applying ultrasonication to the bath. Systems and methods according to embodiments of this disclosure can etch, for example, silicon-based structures, e.g., Si, $SiO_2$, $Si_3N_4$, etc., with multi-tiered nano-structures with high fidelity, smooth LER, and consistent alignment across batches.

BRIEF SUMMARY

Disclosed herein are systems and methods for fabricating nano-structures on a substrate. The substrate including a plurality of nano-structures can be used in eyepieces for displays, such as for a head wearable device. An example method for fabricating and/or etching a substrate including a plurality of nano-structures for an eyepiece can include submerging the substrate in a bath and applying ultrasonication to the bath for a first time period. The ultrasonication applied to the first bath can agitate the fluid to provide a substantially uniform first reactive environment across the surface of the substrate. The substrate can be submerged in a second bath and ultrasonication can be applied to the second bath for a second time period. The ultrasonication applied to the second bath can agitate the fluid to provide a substantially uniform second reactive environment across the surface of the substrate. In some examples, a predetermined amount of material can be removed from the surface of the substrate during the second time period to produce an etched substrate. In some examples, the predetermined amount of material removed can be based on a length of the first time period and further on a length of the second time period. Embodiments herein provide for a system and method to inexpensively fabricate nano-structures that are less than 50 nm with high fidelity (no line breaks, smooth line edges) to achieve the desired nano-structure resolution. Moreover, embodiments, herein provide for a system and method to achieve alignment between multi-tiered layers of nano-structures with smooth line edge roughness (LER).

BRIEF DESCRIPTION OF THE DRAWINGS

FIGS. 10A-10B illustrate example nano-structures for an example mixed reality system, manufactured according to one or more embodiments of the disclosure.

FIGS. 12A-12C illustrates example nano-structures for an example mixed reality system, according to one or more embodiments of the disclosure.

FIG. 14 illustrates an example block diagram of a process for manufacturing nano-structures for an example mixed reality system, according to one or more embodiments of the disclosure.

DETAILED DESCRIPTION

Figure 1A:
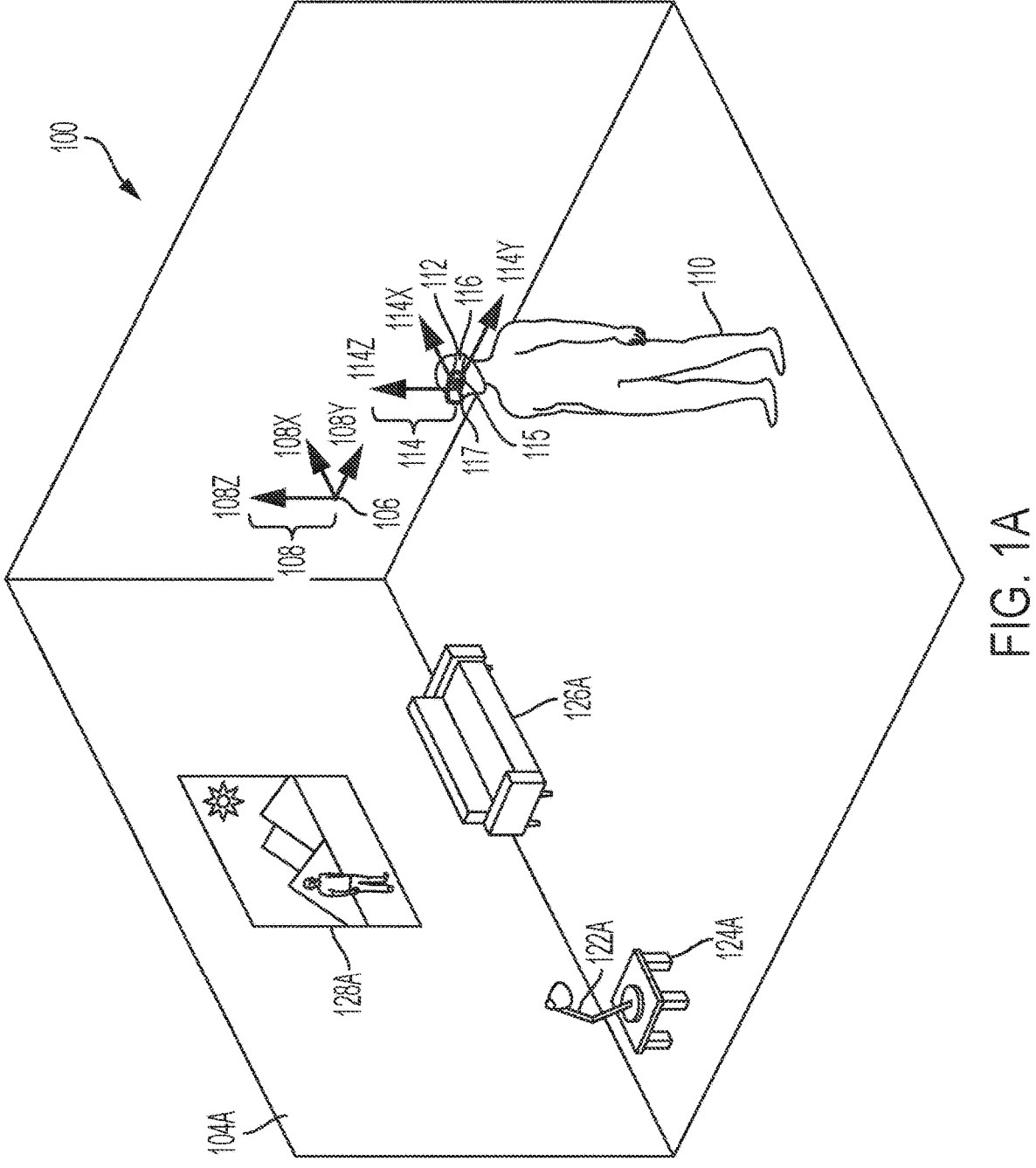
FIGS. 1A-1C illustrate an example mixed reality environment, according to one or more embodiments of the disclosure.

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Mixed Reality Environment

Like all people, a user of a mixed reality system exists in a real environment—that is, a three-dimensional portion of the "real world," and all of its contents, that are perceptible by the user. For example, a user perceives a real environment using one's ordinary human senses—sight, sound, touch, taste, smell—and interacts with the real environment by moving one's own body in the real environment. Locations in a real environment can be described as coordinates in a coordinate space; for example, a coordinate can comprise latitude, longitude, and elevation with respect to sea level; distances in three orthogonal dimensions from a reference point; or other suitable values. Likewise, a vector can describe a quantity having a direction and a magnitude in the coordinate space.

A computing device can maintain, for example in a memory associated with the device, a representation of a virtual environment. As used herein, a virtual environment is a computational representation of a three-dimensional space. A virtual environment can include representations of any object, action, signal, parameter, coordinate, vector, or other characteristic associated with that space. In some examples, circuitry (e.g., a processor) of a computing device can maintain and update a state of a virtual environment; that is, a processor can determine at a first time t0, based on data associated with the virtual environment and/or input provided by a user, a state of the virtual environment at a second time t1. For instance, if an object in the virtual environment is located at a first coordinate at time t0, and has certain programmed physical parameters (e.g., mass, coefficient of friction); and an input received from user indicates that a force should be applied to the object in a direction vector; the processor can apply laws of kinematics to determine a location of the object at time t1 using basic mechanics. The processor can use any suitable information known about the virtual environment, and/or any suitable input, to determine a state of the virtual environment at a time t1. In maintaining and updating a state of a virtual environment, the processor can execute any suitable software, including software relating to the creation and deletion of virtual objects in the virtual environment; software (e.g., scripts) for defining behavior of virtual objects or characters in the virtual environment; software for defining the behavior of signals (e.g., audio signals) in the virtual environment; software for creating and updating parameters associated with the virtual environment; software for generating audio signals in the virtual environment; software for handling input and output; software for implementing network operations; software for applying asset data (e.g., animation data to move a virtual object over time); or many other possibilities.

Output devices, such as a display or a speaker, can present any or all aspects of a virtual environment to a user. For example, a virtual environment may include virtual objects (which may include representations of inanimate objects; people; animals; lights; etc.) that may be presented to a user. A processor can determine a view of the virtual environment (for example, corresponding to a "camera" with an origin coordinate, a view axis, and a frustum); and render, to a display, a viewable scene of the virtual environment corresponding to that view. Any suitable rendering technology may be used for this purpose. In some examples, the viewable scene may include only some virtual objects in the virtual environment, and exclude certain other virtual objects. Similarly, a virtual environment may include audio aspects that may be presented to a user as one or more audio signals. For instance, a virtual object in the virtual environment may generate a sound originating from a location coordinate of the object (e.g., a virtual character may speak or cause a sound effect); or the virtual environment may be associated with musical cues or ambient sounds that may or may not be associated with a particular location. A processor can determine an audio signal corresponding to a "listener" coordinate—for instance, an audio signal corresponding to a composite of sounds in the virtual environment, and mixed and processed to simulate an audio signal that would be heard by a listener at the listener coordinate—and present the audio signal to a user via one or more speakers.

Because a virtual environment exists only as a computational structure, a user cannot directly perceive a virtual environment using one's ordinary senses. Instead, a user can perceive a virtual environment only indirectly, as presented to the user, for example by a display, speakers, haptic output devices, etc. Similarly, a user cannot directly touch, manipulate, or otherwise interact with a virtual environment; but can provide input data, via input devices or sensors, to a processor that can use the device or sensor data to update the virtual environment. For example, a camera sensor can provide optical data indicating that a user is trying to move an object in a virtual environment, and a processor can use that data to cause the object to respond accordingly in the virtual environment.

A mixed reality system can present to the user, for example using a transmissiblef display and/or one or more speakers (which may, for example, be incorporated into a wearable head device), a mixed reality environment ("MRE") that combines aspects of a real environment and a virtual environment. In some embodiments, the one or more speakers may be external to the head-mounted wearable unit. As used herein, a MRE is a simultaneous representation of a real environment and a corresponding virtual environment. In some examples, the corresponding real and virtual environments share a single coordinate space; in some examples, a real coordinate space and a corresponding virtual coordinate space are related to each other by a transformation matrix (or other suitable representation). Accordingly, a single coordinate (along with, in some examples, a transformation matrix) can define a first location in the real environment, and also a second, corresponding, location in the virtual environment; and vice versa.

In a MRE, a virtual object (e.g., in a virtual environment associated with the MRE) can correspond to a real object (e.g., in a real environment associated with the MRE). For instance, if the real environment of a MRE comprises a real lamp post (a real object) at a location coordinate, the virtual environment of the MRE may comprise a virtual lamp post (a virtual object) at a corresponding location coordinate. As used herein, the real object in combination with its corresponding virtual object together constitute a "mixed reality object." It is not necessary for a virtual object to perfectly match or align with a corresponding real object. In some examples, a virtual object can be a simplified version of a corresponding real object. For instance, if a real environment includes a real lamp post, a corresponding virtual object may comprise a cylinder of roughly the same height and radius as the real lamp post (reflecting that lamp posts may be roughly cylindrical in shape). Simplifying virtual objects in this manner can allow computational efficiencies, and can simplify calculations to be performed on such virtual objects. Further, in some examples of a MRE, not all real objects in a real environment may be associated with a corresponding virtual object. Likewise, in some examples of a MRE, not all virtual objects in a virtual environment may be associated with a corresponding real object. That is, some virtual objects may solely in a virtual environment of a MRE, without any real-world counterpart.

In some examples, virtual objects may have characteristics that differ, sometimes drastically, from those of corresponding real objects. For instance, while a real environment in a MRE may comprise a green, two-armed cactus—a prickly inanimate object—a corresponding virtual object in the MRE may have the characteristics of a green, two-armed virtual character with human facial features and a surly demeanor. In this example, the virtual object resembles its corresponding real object in certain characteristics (color, number of arms); but differs from the real object in other characteristics (facial features, personality). In this way, virtual objects have the potential to represent real objects in a creative, abstract, exaggerated, or fanciful manner; or to impart behaviors (e.g., human personalities) to otherwise inanimate real objects. In some examples, virtual objects may be purely fanciful creations with no real-world counterpart (e.g., a virtual monster in a virtual environment, perhaps at a location corresponding to an empty space in a real environment).

Compared to VR systems, which present the user with a virtual environment while obscuring the real environment, a mixed reality system presenting a MRE affords the advantage that the real environment remains perceptible while the virtual environment is presented. Accordingly, the user of the mixed reality system is able to use visual and audio cues associated with the real environment to experience and interact with the corresponding virtual environment. As an example, while a user of VR systems may struggle to perceive or interact with a virtual object displayed in a virtual environment—because, as noted above, a user cannot directly perceive or interact with a virtual environment—a user of an MR system may find it intuitive and natural to interact with a virtual object by seeing, hearing, and touching a corresponding real object in his or her own real environment. This level of interactivity can heighten a user's feelings of immersion, connection, and engagement with a virtual environment. Similarly, by simultaneously presenting a real environment and a virtual environment, mixed reality systems can reduce negative psychological feelings (e.g., cognitive dissonance) and negative physical feelings (e.g., motion sickness) associated with VR systems. Mixed reality systems further offer many possibilities for applications that may augment or alter our experiences of the real world.

FIG. 1A illustrates an example real environment 100 in which a user 110 uses a mixed reality system 112. Mixed reality system 112 may comprise a display (e.g., a transmissible display) and one or more speakers, and one or more sensors (e.g., a camera), for example as described below. The real environment 100 shown comprises a rectangular room 104A, in which user 110 is standing; and real objects 122A (a lamp), 124A (a table), 126A (a sofa), and 128A (a painting). Room 104A further comprises a location coordinate 106, which may be considered an origin of the real environment 100. As shown in FIG. 1A, an environment/world coordinate system 108 (comprising an x-axis 108X, a y-axis 108Y, and a z-axis 108Z) with its origin at point 106 (a world coordinate), can define a coordinate space for real environment 100. In some embodiments, the origin point 106 of the environment/world coordinate system 108 may correspond to where the mixed reality system 112 was powered on. In some embodiments, the origin point 106 of the environment/world coordinate system 108 may be reset during operation. In some examples, user 110 may be considered a real object in real environment 100; similarly, user 110's body parts (e.g., hands, feet) may be considered real objects in real environment 100. In some examples, a user/listener/head coordinate system 114 (comprising an x-axis 114X, a y-axis 114Y, and a z-axis 114Z) with its origin at point 115 (e.g., user/listener/head coordinate) can define a coordinate space for the user/listener/head on which the mixed reality system 112 is located. The origin point 115 of the user/listener/head coordinate system 114 may be defined relative to one or more components of the mixed reality system 112. For example, the origin point 115 of the user/listener/head coordinate system 114 may be defined relative to the display of the mixed reality system 112 such as during initial calibration of the mixed reality system 112. A matrix (which may include a translation matrix and a Quaternion matrix or other rotation matrix), or other suitable representation can characterize a transformation between the user/listener/head coordinate system 114 space and the environment/world coordinate system 108 space. In some embodiments, a left ear coordinate 116 and a right ear coordinate 117 may be defined relative to the origin point 115 of the user/listener/head coordinate system 114. A matrix (which may include a translation matrix and a Quaternion matrix or other rotation matrix), or other suitable representation can characterize a transformation between the left ear coordinate 116 and the right ear coordinate 117, and user/listener/head coordinate system 114 space. The user/listener/head coordinate system 114 can simplify the representation of locations relative to the user's head, or to a head-mounted device, for example, relative to the environment/world coordinate system 108. Using Simultaneous Localization and Mapping (SLAM), visual odometry, or other techniques, a transformation between user coordinate system 114 and environment coordinate system 108 can be determined and updated in real-time.

Figure 1B:
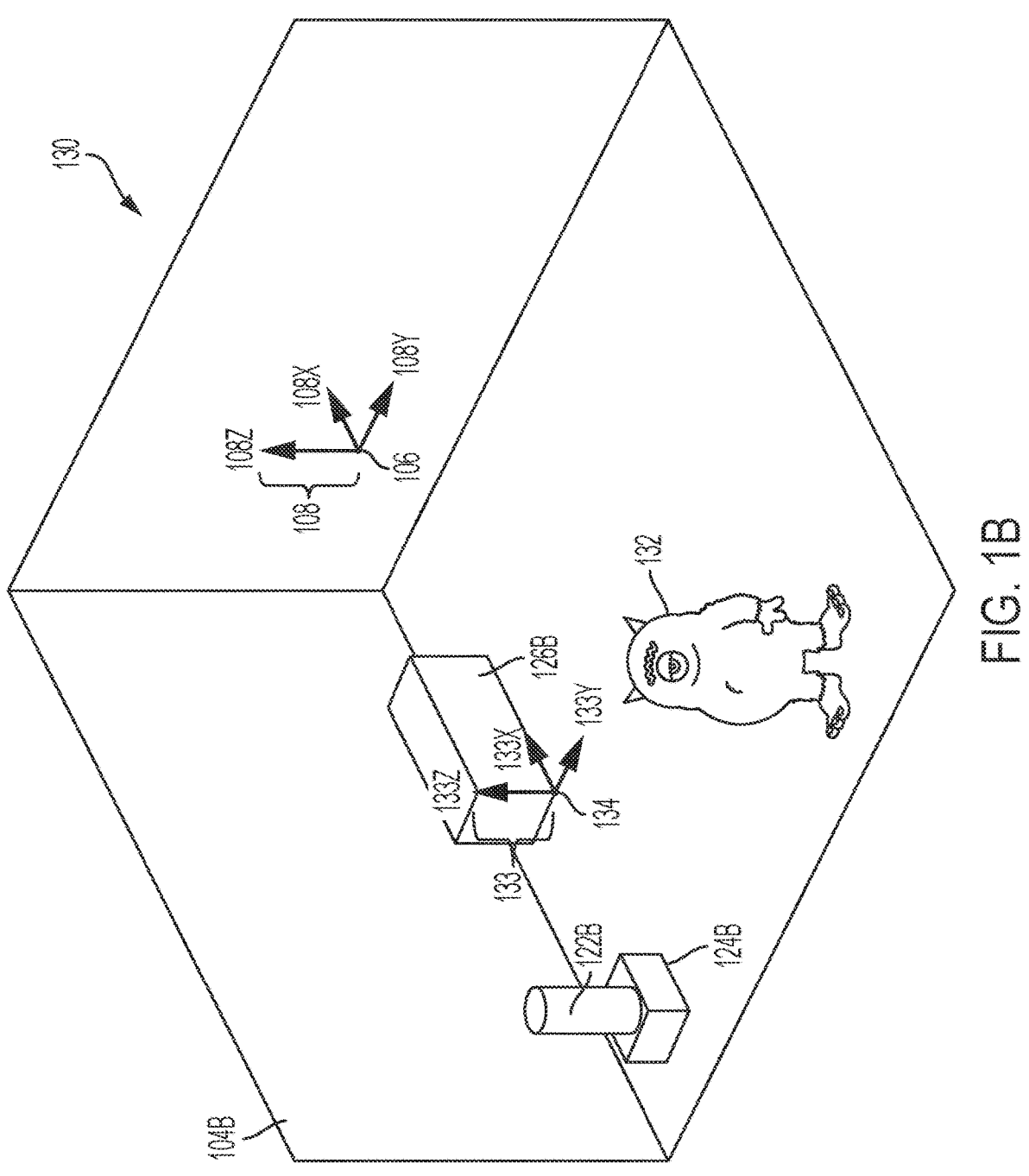

FIG. 1B illustrates an example virtual environment 130 that corresponds to real environment 100. The virtual environment 130 shown comprises a virtual rectangular room 104B corresponding to real rectangular room 104A; a virtual object 122B corresponding to real object 122A; a virtual object 124B corresponding to real object 124A; and a virtual object 126B corresponding to real object 126A. Metadata associated with the virtual objects 122B, 124B, 126B can include information derived from the corresponding real objects 122A, 124A, and 126A. Virtual environment 130 additionally comprises a virtual monster 132, which does not correspond to any real object in real environment 100. Real object 128A in real environment 100 does not correspond to any virtual object in virtual environment 130. A persistent coordinate system 133 (comprising an x-axis 133X, a y-axis 133Y, and a z-axis 133Z) with its origin at point 134 (persistent coordinate), can define a coordinate space for virtual content. The origin point 134 of the persistent coordinate system 133 may be defined relative/with respect to one or more real objects, such as the real object 126A. A matrix (which may include a translation matrix and a Quaternion matrix or other rotation matrix), or other suitable representation can characterize a transformation between the persistent coordinate system 133 space and the environment/world coordinate system 108 space. In some embodiments, each of the virtual objects 122B, 124B, 126B, and 132 may have their own persistent coordinate point relative to the origin point 134 of the persistent coordinate system 133. In some embodiments, there may be multiple persistent coordinate systems and each of the virtual objects 122B, 124B, 126B, and 132 may have their own persistent coordinate point relative to one or more persistent coordinate systems.

Persistent coordinate data may be coordinate data that persists relative to a physical environment. Persistent coordinate data may be used by MR systems (e.g., MR system 112, 200) to place persistent virtual content, which may not be tied to movement of a display on which the virtual object is being displayed. For example, a two-dimensional screen may only display virtual objects relative to a position on the screen. As the two-dimensional screen moves, the virtual content may move with the screen. In some embodiments, persistent virtual content may be displayed in a corner of a room. A MR user may look at the corner, see the virtual content, look away from the corner (where the virtual content may no longer be visible because the virtual content may have moved from within the user's field of view to a location outside the user's field of view due to motion of the user's head), and look back to see the virtual content in the corner (similar to how a real object may behave).

In some embodiments, persistent coordinate data (e.g., a persistent coordinate system and/or a persistent coordinate frame) can include an origin point and three axes. For example, a persistent coordinate system may be assigned to a center of a room by a MR system. In some embodiments, a user may move around the room, out of the room, re-enter the room, etc., and the persistent coordinate system may remain at the center of the room (e.g., because it persists relative to the physical environment). In some embodiments, a virtual object may be displayed using a transform to persistent coordinate data, which may enable displaying persistent virtual content. In some embodiments, a MR system may use simultaneous localization and mapping to generate persistent coordinate data (e.g., the MR system may assign a persistent coordinate system to a point in space). In some embodiments, a MR system may map an environment by generating persistent coordinate data at regular intervals (e.g., a MR system may assign persistent coordinate systems in a grid where persistent coordinate systems may be at least within five feet of another persistent coordinate system).

In some embodiments, persistent coordinate data may be generated by a MR system and transmitted to a remote server. In some embodiments, a remote server may be configured to receive persistent coordinate data. In some embodiments, a remote server may be configured to synchronize persistent coordinate data from multiple observation instances. For example, multiple MR systems may map the same room with persistent coordinate data and transmit that data to a remote server. In some embodiments, the remote server may use this observation data to generate canonical persistent coordinate data, which may be based on the one or more observations. In some embodiments, canonical persistent coordinate data may be more accurate and/or reliable than a single observation of persistent coordinate data. In some embodiments, canonical persistent coordinate data may be transmitted to one or more MR systems. For example, a MR system may use image recognition and/or location data to recognize that it is located in a room that has corresponding canonical persistent coordinate data (e.g., because other MR systems have previously mapped the room). In some embodiments, the MR system may receive canonical persistent coordinate data corresponding to its location from a remote server.

With respect to FIGS. 1A and 1B, environment/world coordinate system 108 defines a shared coordinate space for both real environment 100 and virtual environment 130. In the example shown, the coordinate space has its origin at point 106. Further, the coordinate space is defined by the same three orthogonal axes (108X, 108Y, 108Z). Accordingly, a first location in real environment 100, and a second, corresponding location in virtual environment 130, can be described with respect to the same coordinate space. This simplifies identifying and displaying corresponding locations in real and virtual environments, because the same coordinates can be used to identify both locations. However, in some examples, corresponding real and virtual environments need not use a shared coordinate space. For instance, in some examples (not shown), a matrix (which may include a translation matrix and a Quaternion matrix or other rotation matrix), or other suitable representation can characterize a transformation between a real environment coordinate space and a virtual environment coordinate space.

Figure 1C:
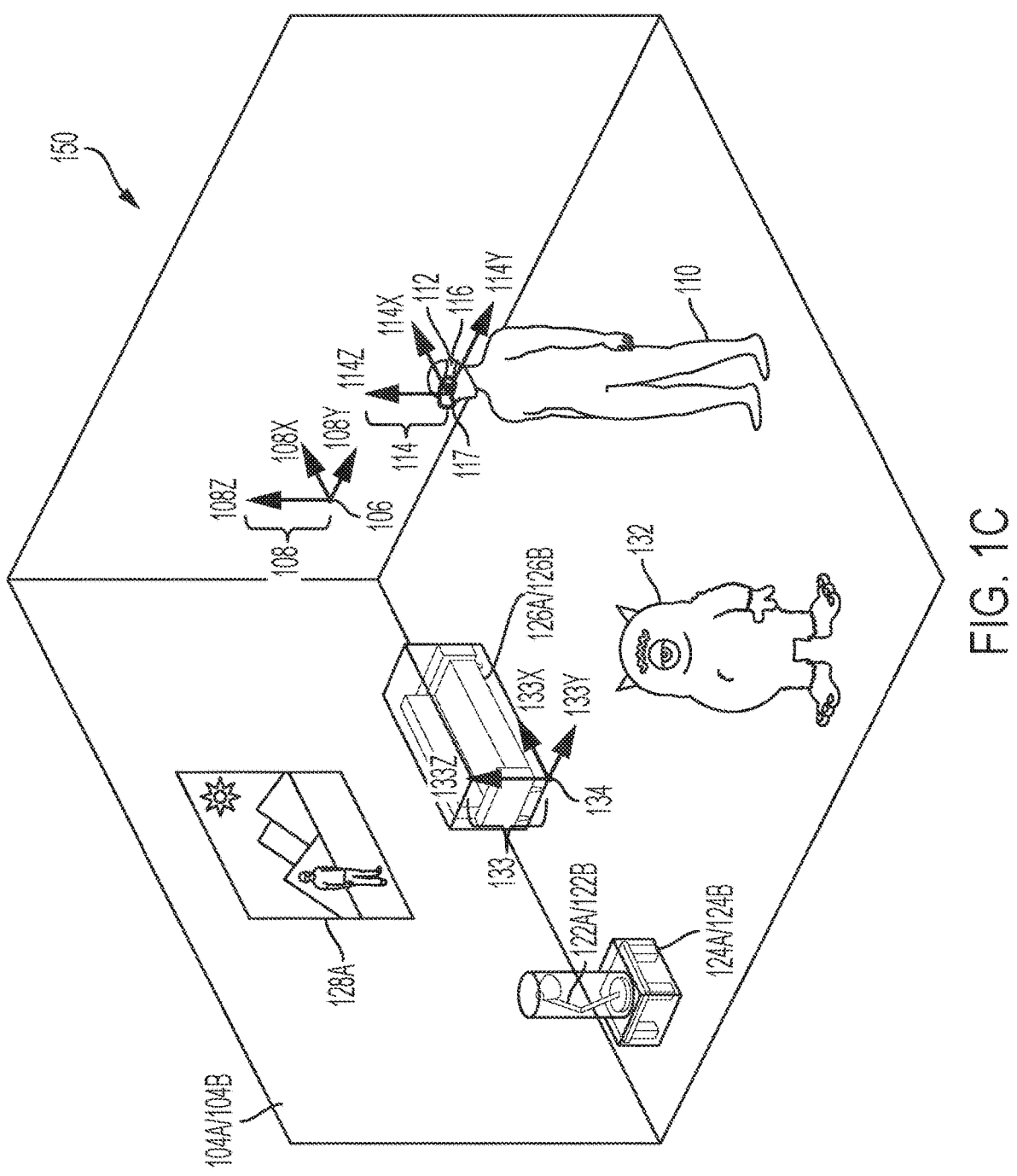

FIG. 1C illustrates an example MRE 150 that simultaneously presents aspects of real environment 100 and virtual environment 130 to user 110 via mixed reality system 112. In the example shown, MRE 150 simultaneously presents user 110 with real objects 122A, 124A, 126A, and 128A from real environment 100 (e.g., via a transmissible portion of a display of mixed reality system 112); and virtual objects 122B, 124B, 126B, and 132 from virtual environment 130 (e.g., via an active display portion of the display of mixed reality system 112). As above, origin point 106 acts as an origin for a coordinate space corresponding to MRE 150, and coordinate system 108 defines an x-axis, y-axis, and z-axis for the coordinate space.

In the example shown, mixed reality objects comprise corresponding pairs of real objects and virtual objects (i.e., 122A/122B, 124A/124B, 126A/126B) that occupy corresponding locations in coordinate space 108. In some examples, both the real objects and the virtual objects may be simultaneously visible to user 110. This may be desirable in, for example, instances where the virtual object presents information designed to augment a view of the corresponding real object (such as in a museum application where a virtual object presents the missing pieces of an ancient damaged sculpture). In some examples, the virtual objects (122B, 124B, and/or 126B) may be displayed (e.g., via active pixelated occlusion using a pixelated occlusion shutter) so as to occlude the corresponding real objects (122A, 124A, and/or 126A). This may be desirable in, for example, instances where the virtual object acts as a visual replacement for the corresponding real object (such as in an interactive storytelling application where an inanimate real object becomes a "living" character).

In some examples, real objects (e.g., 122A, 124A, 126A) may be associated with virtual content or helper data that may not necessarily constitute virtual objects. Virtual content or helper data can facilitate processing or handling of virtual objects in the mixed reality environment. For example, such virtual content could include two-dimensional representations of corresponding real objects; custom asset types associated with corresponding real objects; or statistical data associated with corresponding real objects. This information can enable or facilitate calculations involving a real object without incurring unnecessary computational overhead.

In some examples, the presentation described above may also incorporate audio aspects. For instance, in MRE 150, virtual monster 132 could be associated with one or more audio signals, such as a footstep sound effect that is generated as the monster walks around MRE 150. As described further below, a processor of mixed reality system 112 can compute an audio signal corresponding to a mixed and processed composite of all such sounds in MRE 150, and present the audio signal to user 110 via one or more speakers included in mixed reality system 112 and/or one or more external speakers.

Example Mixed Reality System

Example mixed reality system 112 can include a wearable head device (e.g., a wearable augmented reality or mixed reality head device) comprising a display (which may comprise left and right transmissible displays, which may be near-eye displays, and associated components for coupling light from the displays to the user's eyes); left and right speakers (e.g., positioned adjacent to the user's left and right ears, respectively); an inertial measurement unit (IMU) (e.g., mounted to a temple arm of the head device); an orthogonal coil electromagnetic receiver (e.g., mounted to the left temple piece); left and right cameras (e.g., depth (time-of-flight) cameras) oriented away from the user; and left and right eye cameras oriented toward the user (e.g., for detecting the user's eye movements). However, a mixed reality system 112 can incorporate any suitable display technology, and any suitable sensors (e.g., optical, infrared, acoustic, LIDAR, EOG, GPS, magnetic). In addition, mixed reality system 112 may incorporate networking features (e.g., Wi-Fi capability) to communicate with other devices and systems, including other mixed reality systems. Mixed reality system 112 may further include a battery (which may be mounted in an auxiliary unit, such as a belt pack designed to be worn around a user's waist), a processor, and a memory. The wearable head device of mixed reality system 112 may include tracking components, such as an IMU or other suitable sensors, configured to output a set of coordinates of the wearable head device relative to the user's environment. In some examples, tracking components may provide input to a processor performing a Simultaneous Localization and Mapping (SLAM) and/or visual odometry algorithm. In some examples, mixed reality system 112 may also include a handheld controller 300, and/or an auxiliary unit 320, which may be a wearable beltpack, as described further below.

Figure 2A:
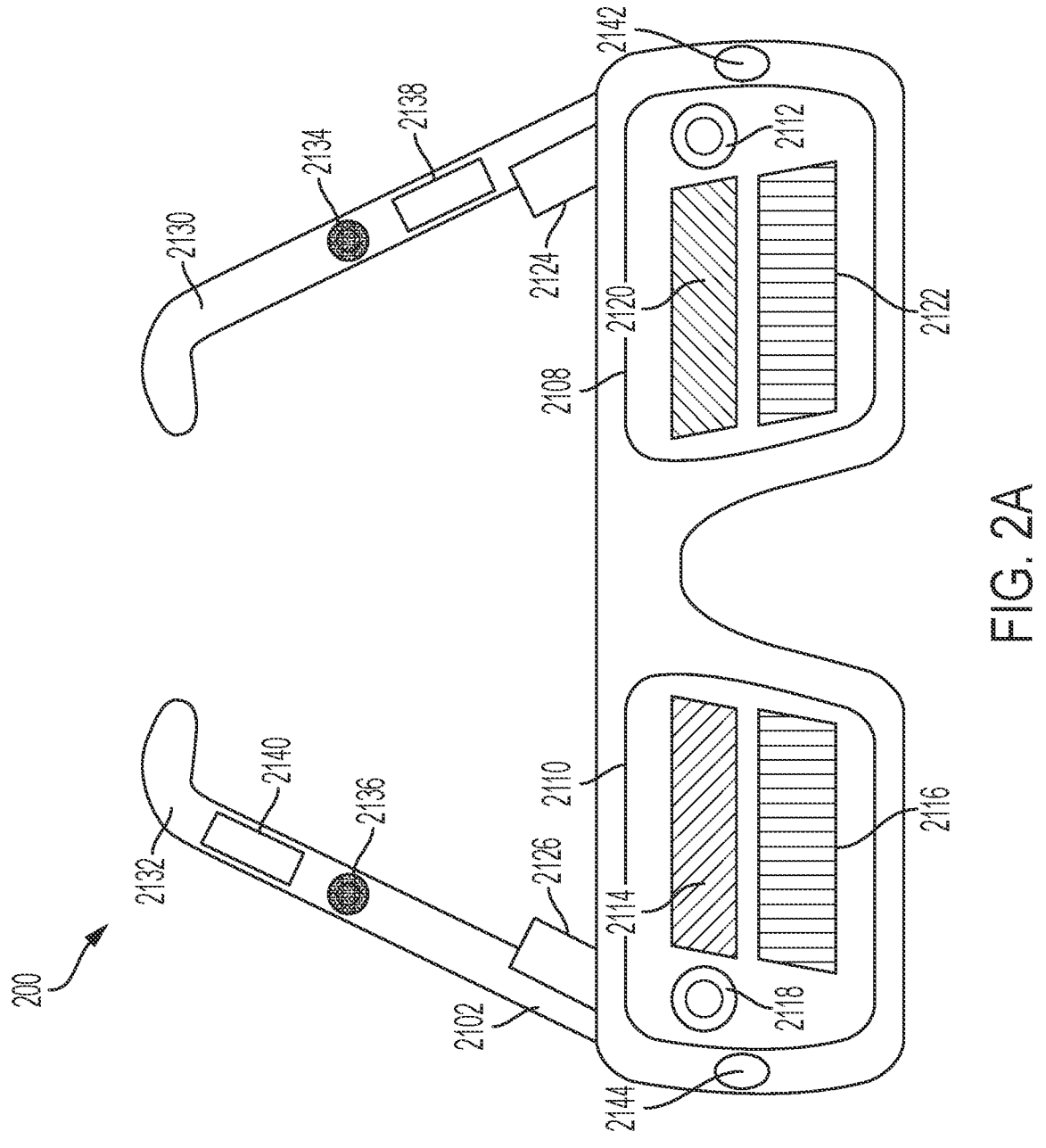
FIGS. 2A-2D illustrate components of an example mixed reality system that can be used to generate and interact with a mixed reality environment, according to one or more embodiments of the disclosure.
Figure 2B:
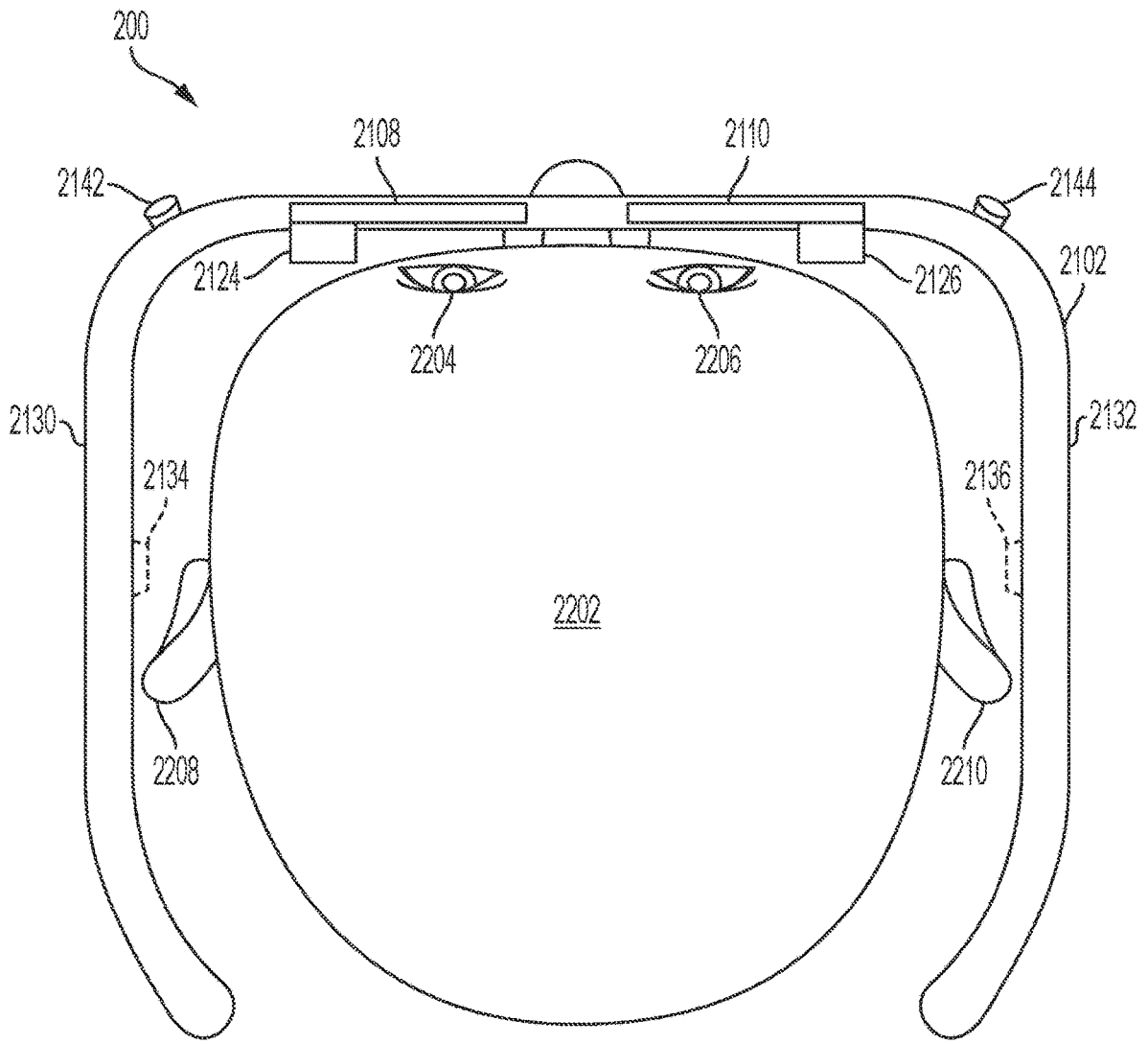
Figure 2C:
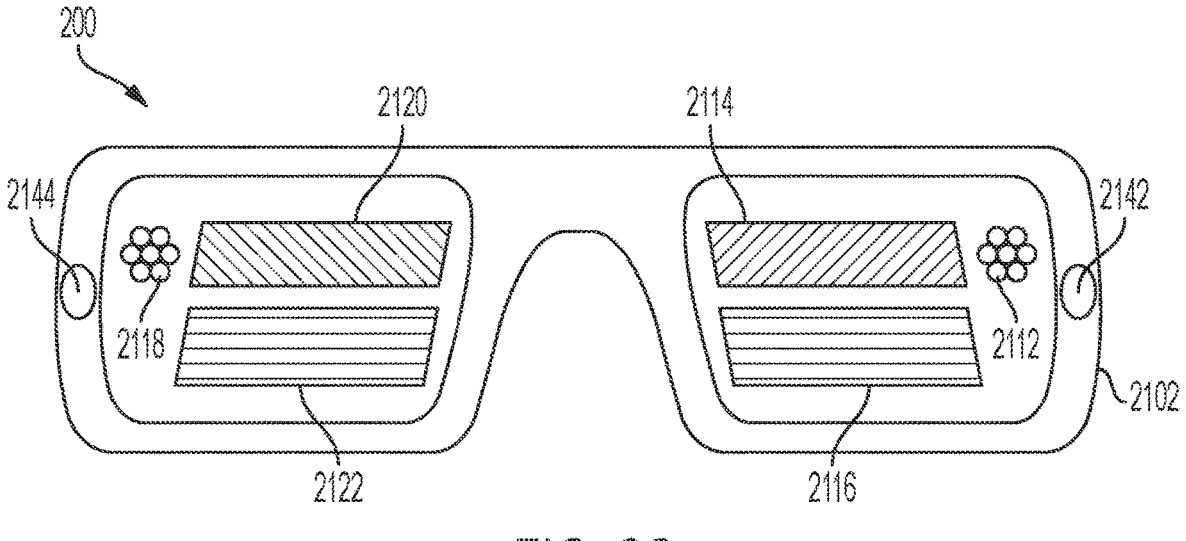
Figure 2D:
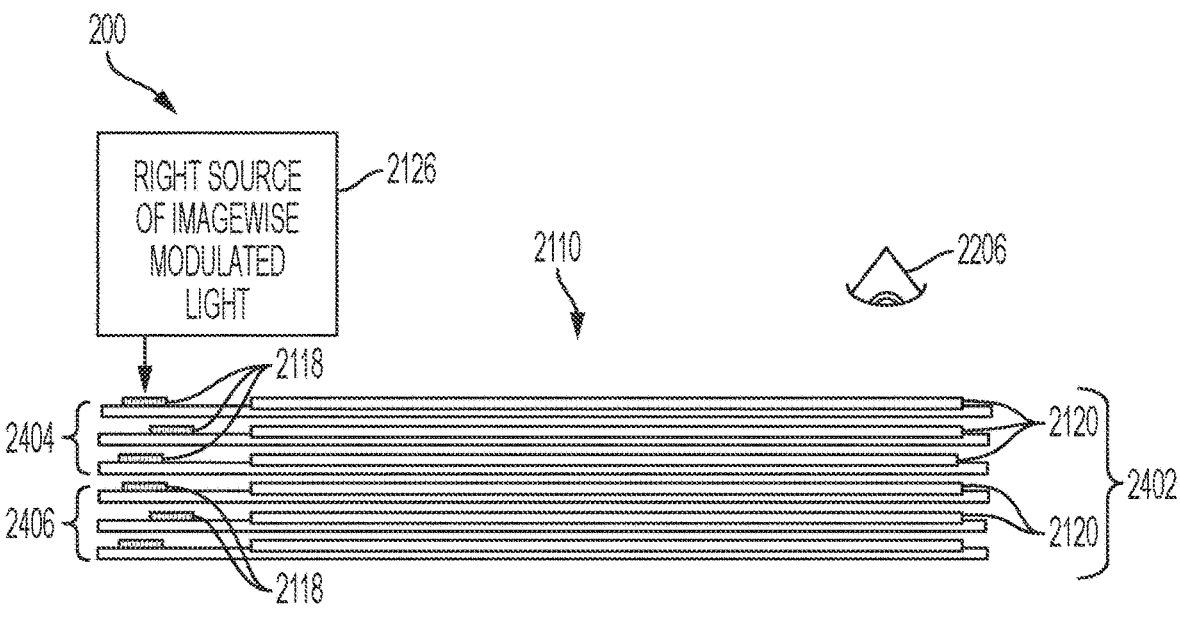

FIGS. 2A-2D illustrate components of an example mixed reality system 200 (which may correspond to mixed reality system 112) that may be used to present a MRE (which may correspond to MRE 150), or other virtual environment, to a user. FIG. 2A illustrates a perspective view of a wearable head device 2102 included in example mixed reality system 200. FIG. 2B illustrates a top view of wearable head device 2102 worn on a user's head 2202. FIG. 2C illustrates a front view of wearable head device 2102. FIG. 2D illustrates an edge view of example eyepiece 2110 of wearable head device 2102. As shown in FIGS. 2A-2C, the example wearable head device 2102 includes an example left eyepiece (e.g., a left transparent waveguide set eyepiece) 2108 and an example right eyepiece (e.g., a right transparent waveguide set eyepiece) 2110. Each eyepiece 2108 and 2110 can include transmissible elements through which a real environment can be visible, as well as display elements for presenting a display (e.g., via imagewise modulated light) overlapping the real environment. In some examples, such display elements can include surface diffractive optical elements for controlling the flow of imagewise modulated light. For instance, the left eyepiece 2108 can include a left in-coupling grating set 2112, a left orthogonal pupil expansion (OPE) grating set 2120, and a left exit (output) pupil expansion (EPE) grating set 2122. As used herein, a pupil may refer to the exit of light from an optical element such as a grating set or reflector. Similarly, the right eyepiece 2110 can include a right in-coupling grating set 2118, a right OPE grating set 2114 and a right EPE grating set 2116. Imagewise modulated light can be transferred to a user's eye via the in-coupling gratings 2112 and 2118, OPEs 2114 and 2120, and EPE 2116 and 2122. Each in-coupling grating set 2112, 2118 can be configured to deflect light toward its corresponding OPE grating set 2120, 2114. Each OPE grating set 2120, 2114 can be designed to incrementally deflect light down toward its associated EPE 2122, 2116, thereby horizontally extending an exit pupil being formed.

Each EPE 2122, 2116 can be configured to incrementally redirect at least a portion of light received from its corresponding OPE grating set 2120, 2114 outward to a user eyebox position (not shown) defined behind the eyepieces 2108, 2110, vertically extending the exit pupil that is formed at the eyebox. Alternatively, in lieu of the in-coupling grating sets 2112 and 2118, OPE grating sets 2114 and 2120, and EPE grating sets 2116 and 2122, the eyepieces 2108 and 2110 can include other arrangements of gratings and/or refractive and reflective features for controlling the coupling of imagewise modulated light to the user's eyes.

In some examples, wearable head device 2102 can include a left temple arm 2130 and a right temple arm 2132, where the left temple arm 2130 includes a left speaker 2134 and the right temple arm 2132 includes a right speaker 2136. An orthogonal coil electromagnetic receiver 2138 can be located in the left temple piece, or in another suitable location in the wearable head unit 2102. An Inertial Measurement Unit (IMU) 2140 can be located in the right temple arm 2132, or in another suitable location in the wearable head device 2102. The wearable head device 2102 can also include a left depth (e.g., time-of-flight) camera 2142 and a right depth camera 2144. The depth cameras 2142, 2144 can be suitably oriented in different directions so as to together cover a wider field of view.

In the example shown in FIGS. 2A-2D, a left source of imagewise modulated light 2124 can be optically coupled into the left eyepiece 2108 through the left in-coupling grating set 2112, and a right source of imagewise modulated light 2126 can be optically coupled into the right eyepiece 2110 through the right in-coupling grating set 2118. Sources of imagewise modulated light 2124, 2126 can include, for example, optical fiber scanners; projectors including electronic light modulators such as Digital Light Processing (DLP) chips or Liquid Crystal on Silicon (LCoS) modulators; or emissive displays, such as micro Light Emitting Diode (μLED) or micro Organic Light Emitting Diode (μOLED) panels coupled into the in-coupling grating sets 2112, 2118 using one or more lenses per side. The input coupling grating sets 2112, 2118 can deflect light from the sources of imagewise modulated light 2124, 2126 to angles above the critical angle for Total Internal Reflection (TIR) for the eyepieces 2108, 2110. The OPE grating sets 2114, 2120 incrementally deflect light propagating by TIR down toward the EPE grating sets 2116, 2122. The EPE grating sets 2116, 2122 incrementally couple light toward the user's face, including the pupils of the user's eyes.

In some examples, as shown in FIG. 2D, each of the left eyepiece 2108 and the right eyepiece 2110 includes a plurality of waveguides 2402. For example, each eyepiece 2108, 2110 can include multiple individual waveguides, each dedicated to a respective color channel (e.g., red, blue and green). In some examples, each eyepiece 2108, 2110 can include multiple sets of such waveguides, with each set configured to impart different wavefront curvature to emitted light. The wavefront curvature may be convex with respect to the user's eyes, for example to present a virtual object positioned a distance in front of the user (e.g., by a distance corresponding to the reciprocal of wavefront curvature). In some examples, EPE grating sets 2116, 2122 can include curved grating grooves to effect convex wavefront curvature by altering the Poynting vector of exiting light across each EPE.

In some examples, to create a perception that displayed content is three-dimensional, stereoscopically-adjusted left and right eye imagery can be presented to the user through the imagewise light modulators 2124, 2126 and the eyepieces 2108, 2110. The perceived realism of a presentation of a three-dimensional virtual object can be enhanced by selecting waveguides (and thus corresponding the wavefront curvatures) such that the virtual object is displayed at a distance approximating a distance indicated by the stereoscopic left and right images. This technique may also reduce motion sickness experienced by some users, which may be caused by differences between the depth perception cues provided by stereoscopic left and right eye imagery, and the autonomic accommodation (e.g., object distance-dependent focus) of the human eye.

FIG. 2D illustrates an edge-facing view from the top of the right eyepiece 2110 of example wearable head device 2102. As shown in FIG. 2D, the plurality of waveguides 2402 can include a first subset of three waveguides 2404 and a second subset of three waveguides 2406. The two subsets of waveguides 2404, 2406 can be differentiated by different EPE gratings featuring different grating line curvatures to impart different wavefront curvatures to exiting light. Within each of the subsets of waveguides 2404, 2406 each waveguide can be used to couple a different spectral channel (e.g., one of red, green and blue spectral channels) to the user's right eye 2206. (Although not shown in FIG. 2D, the structure of the left eyepiece 2108 is analogous to the structure of the right eyepiece 2110.)

Figure 3A:
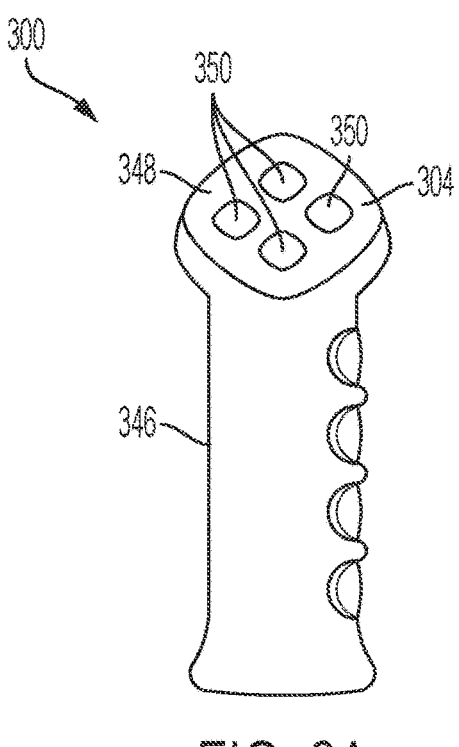
FIG. 3A illustrates an example mixed reality handheld controller that can be used to provide input to a mixed reality environment, according to one or more embodiments of the disclosure.

FIG. 3A illustrates an example handheld controller component 300 of a mixed reality system 200. In some examples, handheld controller 300 includes a grip portion 346 and one or more buttons 350 disposed along a top surface 348. In some examples, buttons 350 may be configured for use as an optical tracking target, e.g., for tracking six-degree-of-freedom (6DOF) motion of the handheld controller 300, in conjunction with a camera or other optical sensor (which may be mounted in a head unit (e.g., wearable head device 2102) of mixed reality system 200). In some examples, handheld controller 300 includes tracking components (e.g., an IMU or other suitable sensors) for detecting position or orientation, such as position or orientation relative to wearable head device 2102. In some examples, such tracking components may be positioned in a handle of handheld controller 300, and/or may be mechanically coupled to the handheld controller. Handheld controller 300 can be configured to provide one or more output signals corresponding to one or more of a pressed state of the buttons; or a position, orientation, and/or motion of the handheld controller 300 (e.g., via an IMU). Such output signals may be used as input to a processor of mixed reality system 200. Such input may correspond to a position, orientation, and/or movement of the handheld controller (and, by extension, to a position, orientation, and/or movement of a hand of a user holding the controller). Such input may also correspond to a user pressing buttons 350.

Figure 3B:
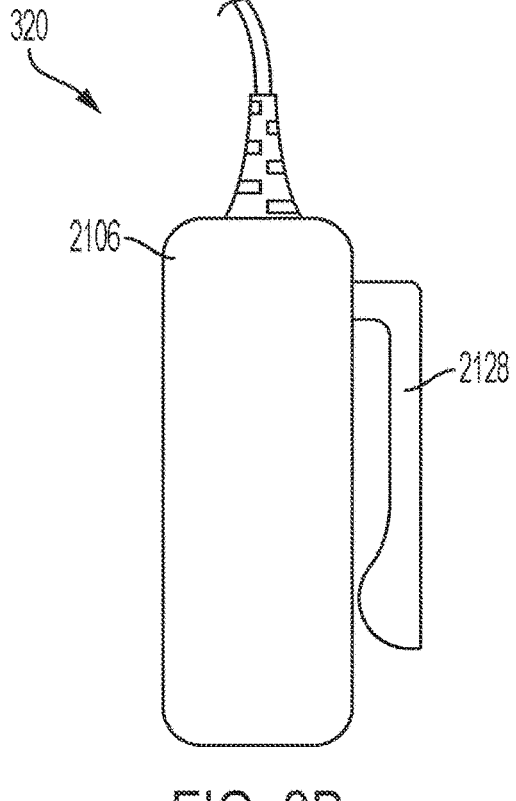
FIG. 3B illustrates an example auxiliary unit that can be used with an example mixed reality system, according to one or more embodiments of the disclosure.

FIG. 3B illustrates an example auxiliary unit 320 of a mixed reality system 200. The auxiliary unit 320 can include a battery to provide energy to operate the system 200, and can include a processor for executing programs to operate the system 200. As shown, the example auxiliary unit 320 includes a clip 2128, such as for attaching the auxiliary unit 320 to a user's belt. Other form factors are suitable for auxiliary unit 320 and will be apparent, including form factors that do not involve mounting the unit to a user's belt. In some examples, auxiliary unit 320 is coupled to the wearable head device 2102 through a multiconduit cable that can include, for example, electrical wires and fiber optics. Wireless connections between the auxiliary unit 320 and the wearable head device 2102 can also be used.

In some examples, mixed reality system 200 can include one or more microphones to detect sound and provide corresponding signals to the mixed reality system. In some examples, a microphone may be attached to, or integrated with, wearable head device 2102, and may be configured to detect a user's voice. In some examples, a microphone may be attached to, or integrated with, handheld controller 300 and/or auxiliary unit 320. Such a microphone may be configured to detect environmental sounds, ambient noise, voices of a user or a third party, or other sounds.

Figure 4:
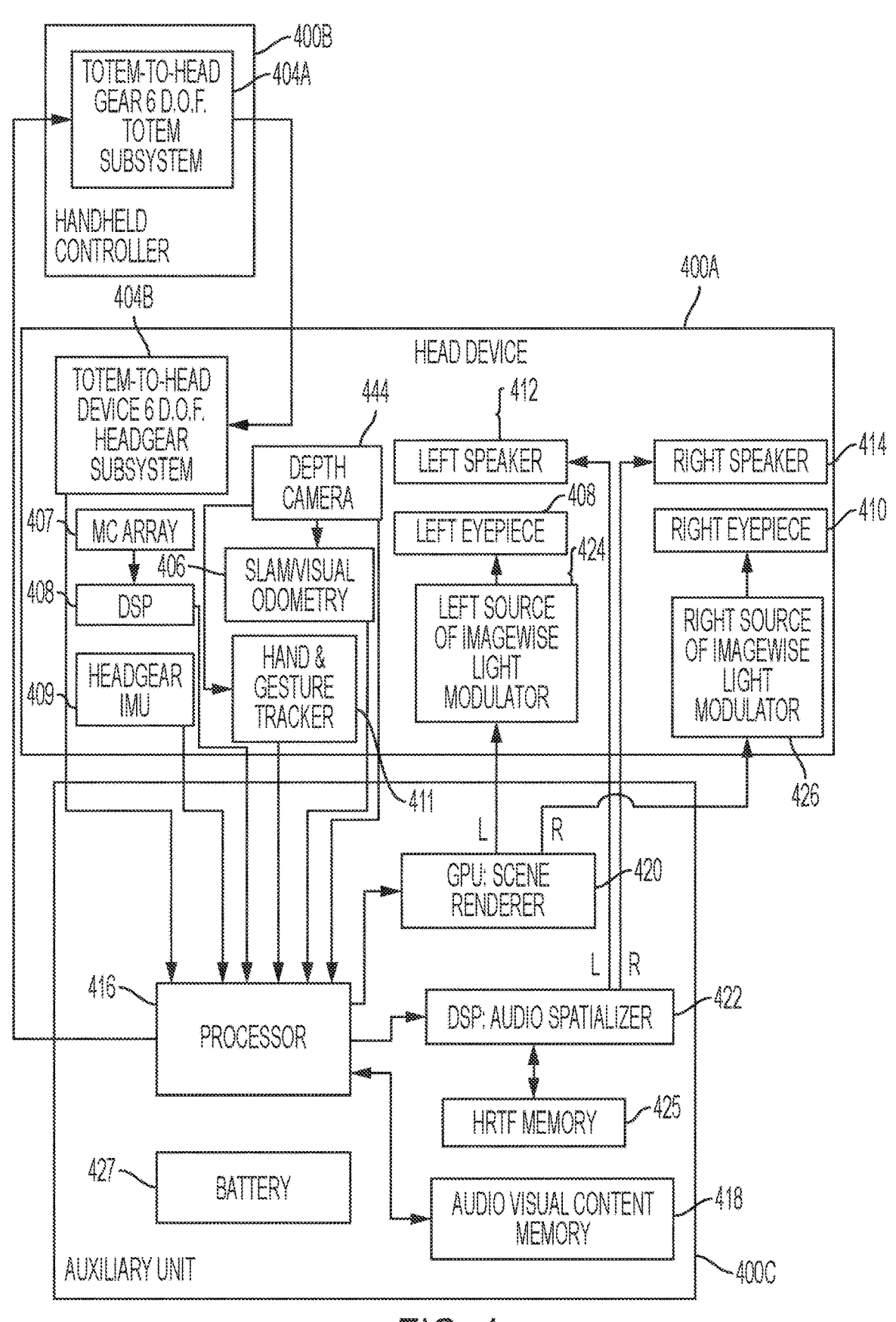
FIG. 4 illustrates an example functional block diagram for an example mixed reality system, according to one or more embodiments of the disclosure.

FIG. 4 shows an example functional block diagram that may correspond to an example mixed reality system, such as mixed reality system 200 described above (which may correspond to mixed reality system 112 with respect to FIG. 1). As shown in FIG. 4, example handheld controller 400B (which may correspond to handheld controller 300 (a "totem")) includes a totem-to-wearable head device six degree of freedom (6DOF) totem subsystem 404A and example wearable head device 400A (which may correspond to wearable head device 2102) includes a totem-to-wearable head device 6DOF subsystem 404B. In the example, the 6DOF totem subsystem 404A and the 6DOF subsystem 404B cooperate to determine six coordinates (e.g., offsets in three translation directions and rotation along three axes) of the handheld controller 400B relative to the wearable head device 400A. The six degrees of freedom may be expressed relative to a coordinate system of the wearable head device 400A. The three translation offsets may be expressed as X, Y, and Z offsets in such a coordinate system, as a translation matrix, or as some other representation. The rotation degrees of freedom may be expressed as sequence of yaw, pitch and roll rotations, as a rotation matrix, as a quaternion, or as some other representation. In some examples, the wearable head device 400A; one or more depth cameras 444 (and/or one or more non-depth cameras) included in the wearable head device 400A; and/or one or more optical targets (e.g., buttons 350 of handheld controller 400B as described above, or dedicated optical targets included in the handheld controller 400B) can be used for 6DOF tracking. In some examples, the handheld controller 400B can include a camera, as described above; and the wearable head device 400A can include an optical target for optical tracking in conjunction with the camera. In some examples, the wearable head device 400A and the handheld controller 400B each include a set of three orthogonally oriented solenoids which are used to wirelessly send and receive three distinguishable signals. By measuring the relative magnitude of the three distinguishable signals received in each of the coils used for receiving, the 6DOF of the wearable head device 400A relative to the handheld controller 400B may be determined. Additionally, 6DOF totem subsystem 404A can include an Inertial Measurement Unit (IMU) that is useful to provide improved accuracy and/or more timely information on rapid movements of the handheld controller 400B.

In some embodiments, wearable system 400 can include microphone array 407, which can include one or more microphones arranged on headgear device 400A. In some embodiments, microphone array 407 can include four microphones. Two microphones can be placed on a front face of headgear 400A, and two microphones can be placed at a rear of head headgear 400A (e.g., one at a back-left and one at a back-right). In some embodiments, signals received by microphone array 407 can be transmitted to DSP 408. DSP 408 can be configured to perform signal processing on the signals received from microphone array 407. For example, DSP 408 can be configured to perform noise reduction, acoustic echo cancellation, and/or beamforming on signals received from microphone array 407. DSP 408 can be configured to transmit signals to processor 416.

In some examples, it may become necessary to transform coordinates from a local coordinate space (e.g., a coordinate space fixed relative to the wearable head device 400A) to an inertial coordinate space (e.g., a coordinate space fixed relative to the real environment), for example in order to compensate for the movement of the wearable head device 400A relative to the coordinate system 108. For instance, such transformations may be necessary for a display of the wearable head device 400A to present a virtual object at an expected position and orientation relative to the real environment (e.g., a virtual person sitting in a real chair, facing forward, regardless of the wearable head device's position and orientation), rather than at a fixed position and orientation on the display (e.g., at the same position in the right lower corner of the display), to preserve the illusion that the virtual object exists in the real environment (and does not, for example, appear positioned unnaturally in the real environment as the wearable head device 400A shifts and rotates). In some examples, a compensatory transformation between coordinate spaces can be determined by processing imagery from the depth cameras 444 using a SLAM and/or visual odometry procedure in order to determine the transformation of the wearable head device 400A relative to the coordinate system 108. In the example shown in FIG. 4, the depth cameras 444 are coupled to a SLAM/visual odometry block 406 and can provide imagery to block 406. The SLAM/visual odometry block 406 implementation can include a processor configured to process this imagery and determine a position and orientation of the user's head, which can then be used to identify a transformation between a head coordinate space and another coordinate space (e.g., an inertial coordinate space). Similarly, in some examples, an additional source of information on the user's head pose and location is obtained from an IMU 409. Information from the IMU 409 can be integrated with information from the SLAM/visual odometry block 406 to provide improved accuracy and/or more timely information on rapid adjustments of the user's head pose and position.

In some examples, the depth cameras 444 can supply 3D imagery to a hand gesture tracker 411, which may be implemented in a processor of the wearable head device 400A. The hand gesture tracker 411 can identify a user's hand gestures, for example by matching 3D imagery received from the depth cameras 444 to stored patterns representing hand gestures. Other suitable techniques of identifying a user's hand gestures will be apparent.

In some examples, one or more processors 416 may be configured to receive data from the wearable head device's 6DOF headgear subsystem 404B, the IMU 409, the SLAM/visual odometry block 406, depth cameras 444, and/or the hand gesture tracker 411. The processor 416 can also send and receive control signals from the 6DOF totem system 404A. The processor 416 may be coupled to the 6DOF totem system 404A wirelessly, such as in examples where the handheld controller 400B is untethered. Processor 416 may further communicate with additional components, such as an audio-visual content memory 418, a Graphical Processing Unit (GPU) 420, and/or a Digital Signal Processor (DSP) audio spatializer 422. The DSP audio spatializer 422 may be coupled to a Head Related Transfer Function (HRTF) memory 425. The GPU 420 can include a left channel output coupled to the left source of imagewise modulated light 424 and a right channel output coupled to the right source of imagewise modulated light 426. GPU 420 can output stereoscopic image data to the sources of imagewise modulated light 424, 426, for example as described above with respect to FIGS. 2A-2D. The DSP audio spatializer 422 can output audio to a left speaker 412 and/or a right speaker 414. The DSP audio spatializer 422 can receive input from processor 419 indicating a direction vector from a user to a virtual sound source (which may be moved by the user, e.g., via the handheld controller 320). Based on the direction vector, the DSP audio spatializer 422 can determine a corresponding HRTF (e.g., by accessing a HRTF, or by interpolating multiple HRTFs). The DSP audio spatializer 422 can then apply the determined HRTF to an audio signal, such as an audio signal corresponding to a virtual sound generated by a virtual object. This can enhance the believability and realism of the virtual sound, by incorporating the relative position and orientation of the user relative to the virtual sound in the mixed reality environment—that is, by presenting a virtual sound that matches a user's expectations of what that virtual sound would sound like if it were a real sound in a real environment.

In some examples, such as shown in FIG. 4, one or more of processor 416, GPU 420, DSP audio spatializer 422, HRTF memory 425, and audio/visual content memory 418 may be included in an auxiliary unit 400C (which may correspond to auxiliary unit 320 described above). The auxiliary unit 400C may include a battery 427 to power its components and/or to supply power to the wearable head device 400A or handheld controller 400B. Including such components in an auxiliary unit, which can be mounted to a user's waist, can limit the size and weight of the wearable head device 400A, which can in turn reduce fatigue of a user's head and neck.

While FIG. 4 presents elements corresponding to various components of an example mixed reality system, various other suitable arrangements of these components will become apparent to those skilled in the art. For example, elements presented in FIG. 4 as being associated with auxiliary unit 400C could instead be associated with the wearable head device 400A or handheld controller 400B. Furthermore, some mixed reality systems may forgo entirely a handheld controller 400B or auxiliary unit 400C. Such changes and modifications are to be understood as being included within the scope of the disclosed examples.

Ultrasonication for Nano-Structure Fabrication

A wearable head device or head mounted display of an example mixed reality system (e.g., mixed reality system 200) may include an optical system with an eyepiece for presenting an image to a user via the display. The eyepiece can include one or more optical gratings (e.g., in-coupling grating set 2112, left orthogonal pupil expansion (OPE) grating set 2120, and left exit (output) pupil expansion (EPE) grating set 2122, right eyepiece 2110 can include a right in-coupling grating set 2118, a right OPE grating set 2114 and a right EPE grating set 2116). The one or more optical gratings can be used to transfer imagewise light to a user's eye.

As discussed above, nano-structures that form the optical gratings can be fabricated with lithography processes. The nano-structures can be multi-tier symmetric and/or asymmetric. However, fabricating nano-structures using lithography can be expensive and complex. For example, fabricating nano-structures that are less than 50 nm with high fidelity (no line breaks, smooth line edges) may use expensive lithography techniques, such as E-beam lithography, to achieve the desired nano-structure resolution. Even with such lithography techniques, aligning components to produce lithography masters and/or a final product at the nanometer scale can be difficult and the resulting nano-structure can be prone to uneven line edge roughness (LER).

In order to address the issues associated with expensive lithography techniques used to fabricate nano-structures, systems and methods according to embodiments of this disclosure rely on an ultrasonication process to etch and form the desired nano-structures on a substrate. For example, embodiments according to this disclosure may use an ultrasonication sequence process to achieve desired etch selectivity of the different material layers deposited on a substrate. The ultrasonication sequence process can include submerging a substrate in a bath of a base solution, acid solution, and/or water and applying ultrasonication to the bath. Systems and methods according to embodiments of this disclosure can etch, for example, silicon-based structures, e.g., Si, $SiO_2$, $Si_3N_4$, etc., with multi-tiered nano-structures with high fidelity, smooth LER, and consistent alignment across batches.

Figure 5:
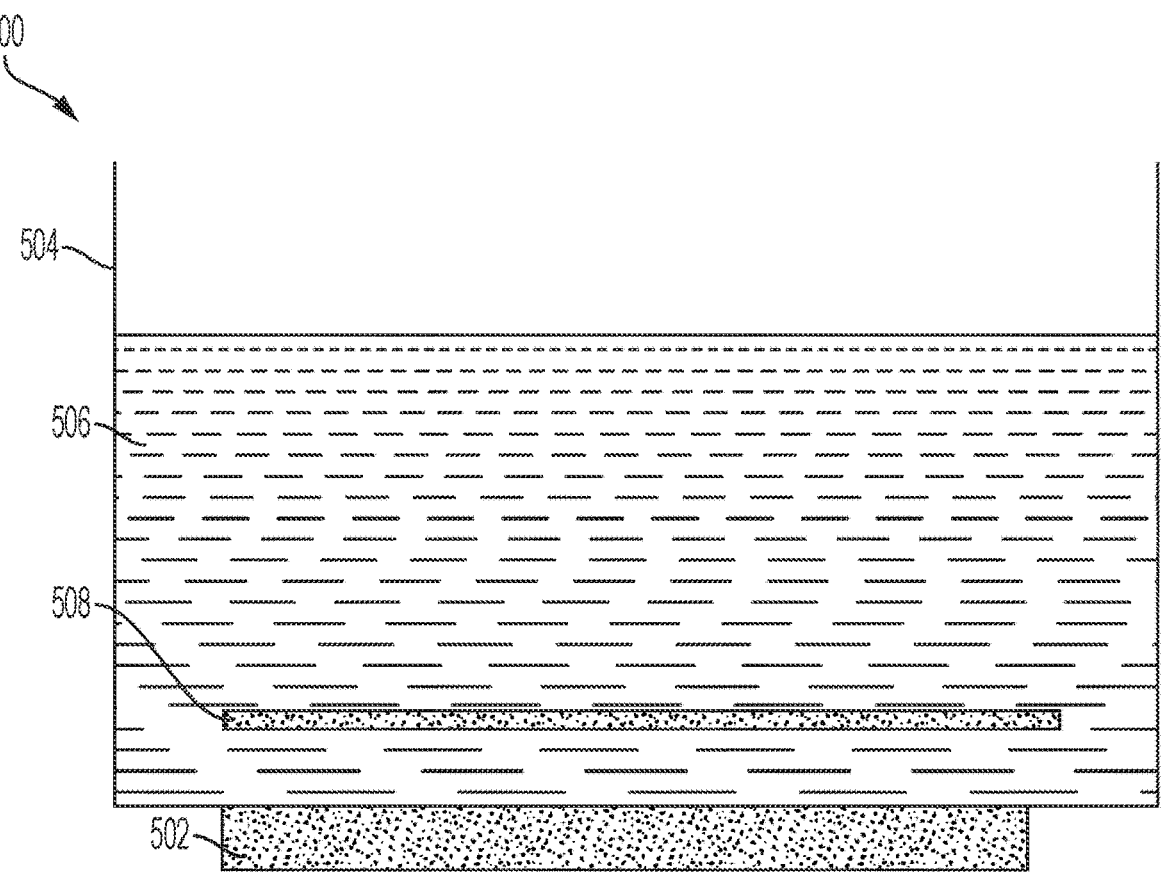
FIG. 5 illustrates an example ultrasonication set-up according to one or more embodiments of the disclosure.

As used herein, ultrasonication may refer to a process of applying sound energy and agitation using a transducer to a vessel containing a fluid as a medium to provide reactive etch species and/or remove away reacted species, residue, particles, debris, etc. FIG. 5 illustrates an example of an exemplary ultrasonication set-up 500 according to embodiments of this disclosure. The exemplary set-up 500 can include at least a transducer 502, a vessel 504, and a liquid bath 506. The transducer 502 may be provided to apply sound waves to the vessel 504. For example, the transducer can provide waves at 20-200 KHz. The liquid bath, e.g., a fluid, can be a base solution, an acid solution and/or water. In some embodiments, the acid solutions can include sulfuric acid, citric acid, etc. In some embodiments, the base solutions can include potassium hydroxide and/or hydrogen peroxide. In some examples, the acid and base solutions can have chemical concertation of about 1-20% with a pH ranging from about 3-11. In some embodiments, the energy from the transducer can be pulsed at certain intervals rather than being continuously pulsed.

As shown in the figure, the substrate 508 to be etched may be placed in the vessel 504. In one or more examples, the substrate can be formed from silicon, silicon dioxide, silicon nitride, and/or other silicon-based substrate materials. In some embodiments, the liquid bath of the ultrasonication set-up 500 may be at a room temperature during the ultrasonication process. In some embodiments, the liquid bath of the ultrasonication set-up may be at an elevated temperature, e.g., above room temperature about 40-80 C. For example, a heater (not shown) can be coupled to the vessel 504 to achieve a desired temperature for the liquid bath 506.

In one or more examples, the substrate 508 can be sequentially placed in a bath of a base solution, an acid solution, and/or water. As the substrate 508 is submerged in the liquid bath 506, the transducer 502 can apply sound waves to the vessel 504. The waves can agitate the fluid in the vessel 504. In this manner, ultrasonication can assist the reaction between the fluid and the substrate as well as the removal rate of the reacted species, e.g., etched material, and reacted solution away from the substrate surface and replenish the substrate surface with a new reactive environment, e.g., unreacted solution, for the reaction to continue. In some examples, acid and/or base solutions may be selected based on its reactivity with the substrate material. For example, the acid and/or base solutions may be selected based on their ability to react with a surface of the substrate material and remove, e.g., etch away, material from a surface of the substrate 508.

In some examples, a plurality of hydrolysis reactions occurring at the surface of the substrate 508 can gradually remove the silicon material. For example, hydrolysis of the silicon dioxide bond can occur on the substrate 508 surface due to proton transfer from hydronium ions (H3O+), hydroxide (OH−), and/or hydrogen-bonded complex molecules present in the acid and/or base solutions. For instance, at the solid to liquid (e.g., silicon dioxide to solution) interface silanol (SI—OH) bonds can be created thereby reducing the energy barrier of silicon dioxide and silanol bonds. This can result in an increase in reaction by protonation due to the smaller energy requirement to break the bonds between molecules. The energy barrier reduction can also result from the presence of h-bonded complexes in the water solution, which can contribute to proton transfer. The equations that govern the acid and base protonation reaction for silicon with silanol present at the substrate surface to solution interface, is provided given below equations 1 and 2.

$$Si-OH + H_3O^+ \rightleftharpoons Si-OH_2^+ + H_2O \quad (1)$$

$$Si-OH + OH^- \rightleftharpoons Si-O^- + H_2O \quad (2)$$

Table 1 shows exemplary etch rates of silicon and silicon dioxide nano-structures using ultrasonication processes according to embodiments of this disclosure. As used herein, the etch rate can be used to refer to the rate of material removal from a surface of a substrate. In some embodiments, submerging the substrate in the liquid bath and applying ultrasonication to the bath can provide a substantially uniform reactive environment across the surface of the substrate, thereby providing substantially uniform etching and material removal across the substrate surface. The example shown in table 1 can correspond to treating a substrate in with a base solution (2% base solution with a pH of 11 in water) for about 8 minutes at about 60 C and an acid solution (2% acid solution with a pH of 3 in water) for about 20 minutes at about 60 C). The concentrations of the base and acid solutions are exemplary and not intended to limit the scope of this disclosure. Moreover, the etch rates shown in Table 1 are exemplary and can vary with different ultrasonication conditions, e.g., temperature, acid and/or base solution concentration, and length of time of the ultrasonication process. In some embodiments, the ultrasonication conditions can be tuned to provide a steady and/or consistent etch rate.

TABLE 1

| Process Sequence | Si | SiO2 |
|---|---|---|
| Base, Water | 0 nm/min | 0 nm/min |
| Acid, Water | 0 nm/min | 0 nm/min |
| Base, Acid, Water | 1 nm/min~4 nm/min | 0.2~0.7 nm/min |
| Base, Water, Acid, Water | 1 nm/min~4 nm/min | <0 nm/min |

As shown in the table, treating a silicon substrate and/or a silicon dioxide substrate with a base-water process sequence (e.g., submerging the substrate in base solution bath and applying ultrasonication, followed by submerging the substrate in a water bath and applying ultrasonication) may not result in a discernable removal of material from the surface of the substrate. Similarly, treating a silicon substrate and a silicon dioxide substrate with an acid-water process sequence (e.g., submerging the substrate in base solution acid and applying ultrasonication, followed by submerging the substrate in a water bath and applying ultrasonication) may not result in a discernable removal of material from the surface of the substrate.

However, base-acid-water and base-water-acid-water process sequences may result in discernable etch rates. As seen in Table 1, silicon and silicon dioxide are each associated with different etch rates for different process sequences. This difference in etch rate may be attributed to a weaker energy barrier associated with silicon bonds compared to silicon oxide bonds. For example, the O—Si—O bonds may be stronger in silicon dioxide and lead to a slower hydrolysis reaction, see e.g., Equations 1 and 2, and material removal. For example, treating a silicon substrate with a base-acid-water process sequence can provide an etch rate of about 1-4 nm/min, while treating a silicon dioxide substrate with the same base-acid-water process (e.g., the same solution strength, time, and temperature) resulted in an etch rate of about 0.2-0.7 nm/min. Similarly, treating a silicon substrate with a base-water-acid-water process sequence provided an etch rate of about 1-4 nm/min, while treating a silicon dioxide substrate with the same base-water-acid-water process (e.g., the same solution strength, time, and temperature) resulted in an etch rate of about +5 nm/min.

Applying the ultrasonication process sequences discussed above can provide a predictable etch rate for the substrate materials. Thus, ultrasonication can be used to reduce the dimensions of nano-structures in a controlled and deliberate manner. Due to the substantially uniform reactive environment, the line edge roughness (LERs) can be smooth compared to conventional lithography techniques and precise dimensions can be achieved by tuning one or more ultrasonication conditions. For example, by adjusting the length of time of the ultrasonication bath, the temperature, and/or the solution strength, the amount of material removed may be adjusted. Moreover, because silicon and silicon dioxide are associated with consistent and/or predictable etch rates, the differences in etch rates between these two materials can be leveraged to fabricate multi-tiered structures in a selective and controllable manner.

FIGS. 6A-6B, 7A-7B, 8A-8B, 9A-9B, and 10A-10B illustrate examples of substrates having a plurality of nano-structures that can be fabricated according to embodiments of this disclosure. Nano-structures fabricated according to embodiments of this disclosure can be used, for example, in one or more gratings for an eyepiece that can be used in a wearable head device (e.g., wearable head device 2102).

Figures 6A, 6B, 7A, 7B, 7C:
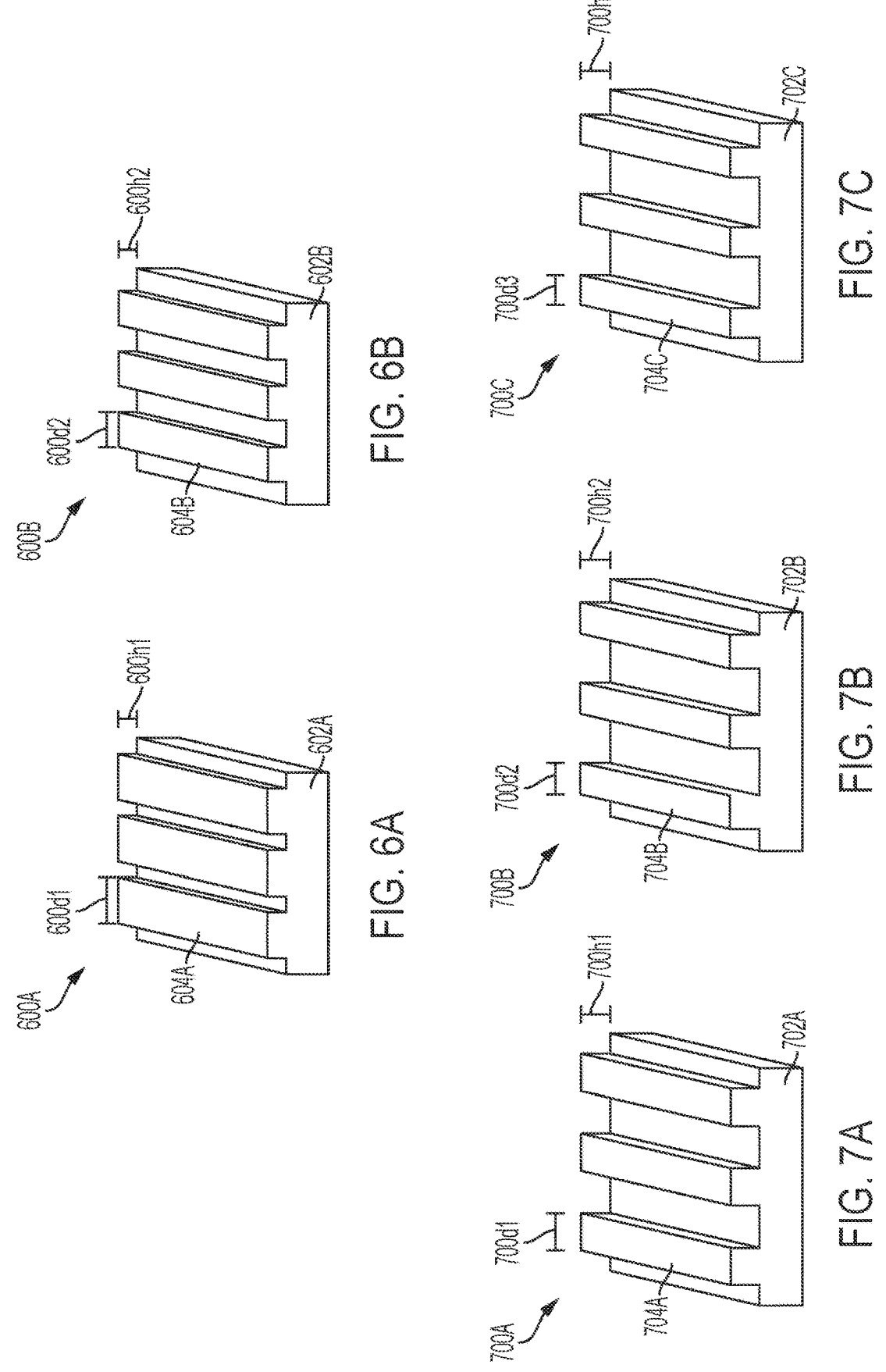
FIGS. 6A-6B illustrate example nano-structures for an example mixed reality system, manufactured according to one or more embodiments of the disclosure.
FIG. 7A-7C illustrates an example nano-structure for an example mixed reality system, manufactured according to one or more embodiments of the disclosure.

FIG. 6A illustrates an exemplary substrate 600A, according to embodiments of this disclosure. As shown in the figure, substrate 600A can include a base 602A and a plurality of nano-structures 604A. The exemplary substrate 600A may be a silicon substrate. The plurality of nano-structures 604A can form a pattern on the surface of the base 602A. As shown in the figure, the plurality of nano-structures 604A can assume a lines and spaces pattern, such that the nano-structures can protrude from a surface of the base 602A. The pattern geometry is not intended to limit the scope of this disclosure and any suitable nano-pattern, including but not limited to, e.g., a pillars pattern, discontinuous lines, curves, holes, cylinders, etc., can be used without departing from the scope of this disclosure. The plurality of nano-structures 604A may be associated with a first height (600h1) and a first width (600d1). In one or more examples, the nano-structures 604A can have a width (600d1) in a range of about 100-250 nm and a height (600h1) of about 70-150 nm. For example, 604A may have a width 600d1 of 196 nm and height 600h1 of 79 nm. These exemplary dimensions are provided for illustrative purposes and not intended to limit the scope of the disclosure.

FIG. 6B illustrates an exemplary etched substrate 600B that has been etched according to one or more embodiments of this disclosure. For example, substrate 600B may be produced by etching silicon substrate 600A using a base-acid-water ultrasonication process sequence according to one or more examples of this disclosure. As discussed above, a silicon substrate may have an etch rate of about 1-4 nm/min using a base-acid-water sequence. As shown in the figure, the etched nano-structures 604B may have a reduced line width 600d2 compared to the line width 600d1. For example, nano-structures 604B may have a width 600d2 of 145 nm and a height 600h2 of 77 nm. These exemplary dimensions are provided for illustrative purposes and not intended to limit the scope of the disclosure. Further, as shown in the figure, the line edge roughness (LER) of the nano-structures 604B can be smooth, particularly when compared to the LER associated with conventional lithography processes at the nano-scale. Comparing the dimensions of nano-structures 604A to nano-structures 604B, the change in the width (600Δd) between 600d1 and 600d2 can be −51 nm, while the change in height (600Δh) between 600h1 and 600h2 can be about-2 nm. In this manner, the line width dimension d can be reduced to achieve a desired nano-structure geometry, while the height of the nano-structures can remain relatively consistent.

FIG. 7A illustrates an exemplary substrate 700A, according to embodiments of this disclosure. As shown in the figure, substrate 700A can include a base 702A and a plurality of nano-structures 704A. The exemplary substrate 700A may be a silicon dioxide substrate. The plurality of nano-structures 704A can form a pattern on the surface of the base 702A. As shown in the figure, the plurality of nano-structures 704A may be a lines and spaces pattern, such that the nano-structures 704A can protrude from a surface of the base 702A. The pattern geometry is not intended to limit the scope of this disclosure and any suitable nano-pattern can be used, as discussed above, without departing from the scope of this disclosure. The plurality of nano-structures 704A may be associated with a first height (700h1) and a first width (700d1). In one or more examples, the nano-structures 704A can have a width (600d1) in a range of about 100-250 nm and a height (600h1) of about 70-150 nm. For example, 704A may have a width 700d1 of 157 nm and height 700h1 of 122 nm. These exemplary dimensions are provided for illustrative purposes and not intended to limit the scope of the disclosure.

FIG. 7B illustrates an exemplary etched substrate 700B that can be etched according to one or more embodiments of this disclosure. For example, substrate 700B may be produced by etching silicon dioxide substrate 700A using a base-acid-water ultrasonication process sequence according to one or more examples of this disclosure. As discussed above, a silicon dioxide substrate may have an etch rate of about 0.2-0.8 nm/min using a base-acid-water sequence. As shown in the figure, the etched nano-structures 704B may have a reduced line width 700d2 compared to the line width 700d1, and an increased height 700h2 compared to height 700h1. For example, nano-structures 704B may have a width 700d2 of 141 nm and a height 700h2 of 125 nm. Comparing the dimensions of nano-structures 704A to nano-structures 704B, the change in the width (700Δd1) between 700d1 and 700d2 can be about-16 nm, while the change in height (700Δh1) between 700h1 and 700h2 can be about +3 nm. These exemplary dimensions are provided for illustrative purposes and not intended to limit the scope of the disclosure. Similar to the example discussed above, the line width dimension d can be reduced to achieve a desired nano-structure geometry, while the height of the nano-structures 704B can remain relatively consistent. Further, the LER of the nano-structures 704B can be smooth, particularly when compared to the LER associated with conventional lithography processes at the nano-scale.

FIG. 7C illustrates an exemplary etched substrate 700C that may be etched according to one or more embodiments of this disclosure. For example, substrate 700C may be produced by etching silicon dioxide substrate 700B using a base-acid-water ultrasonication process sequence according to one or more examples of this disclosure. Accordingly, multiple sequential ultrasonication processes can be performed to achieve a desired nano-structure geometry. As shown in the figure, the etched substrate 700C may have a reduced line width 700d3 compared to the line width 700d2, and an increased height 700h3 compared to height 700h2. For example, 704C may have a width 700d3 of 125 nm and a height 700h3 of 124 nm. Comparing the dimensions of nano-structures 704C to nano-structures 704C, the change in the width (700Δd2) between 700d2 and 700d3 may be about-16 nm, while the change in height (700Δh2) between 700h1 and 700h2 may be about-1 nm. These exemplary dimensions are provided for illustrative purposes and not intended to limit the scope of the disclosure. Similar to the examples discussed above, the line width dimension d can be reduced to achieve a desired nano-structure geometry, while the height of the nano-structures can remain relatively consistent. Further the LER of the nano-structures 704C may be smooth, particularly when compared to the LER associated with conventional lithography processes at the nano-scale.

Figures 8A, 8B, 9A, 9B:
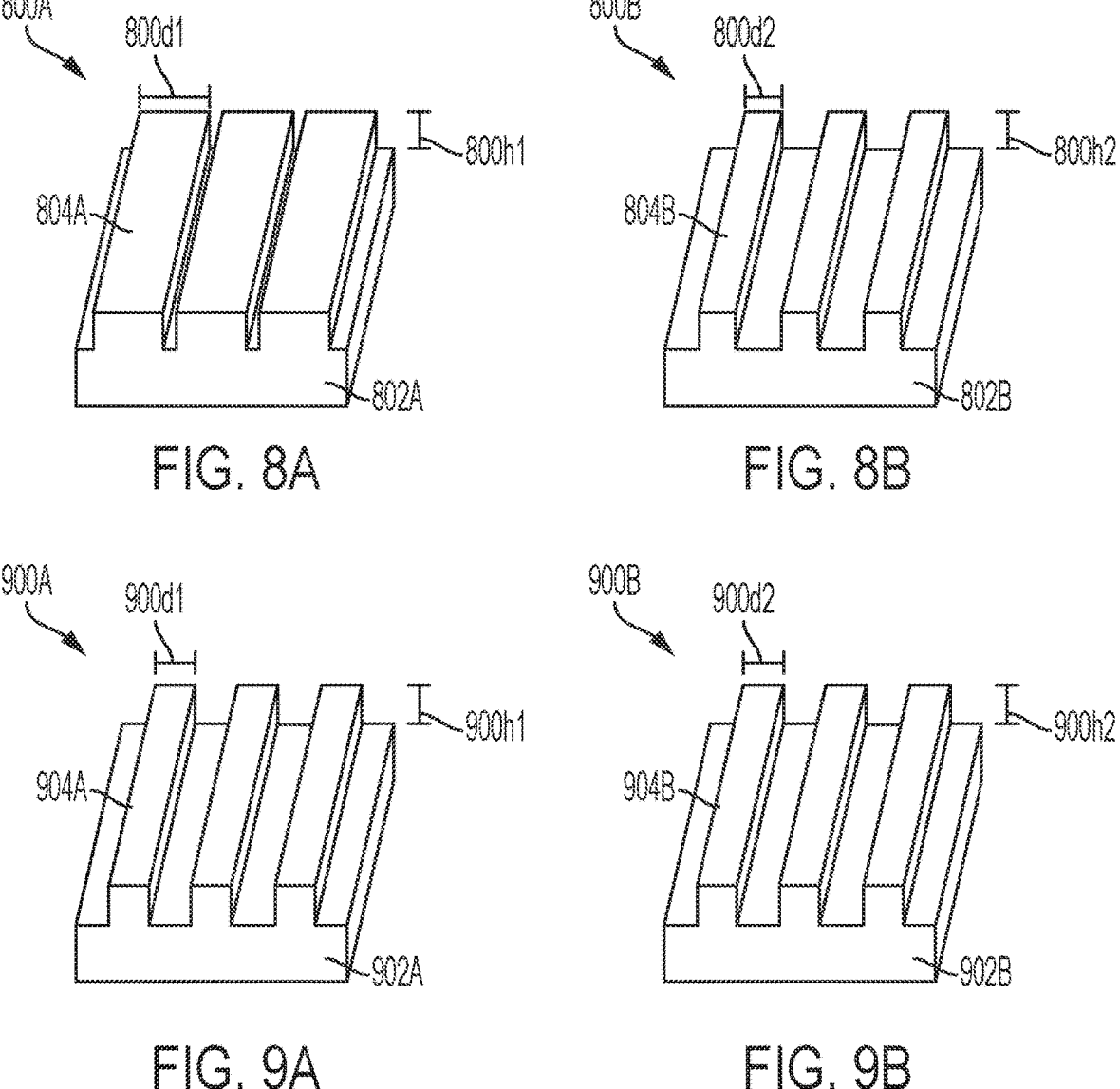
FIGS. 8A-8B illustrate example nano-structures for an example mixed reality system, manufactured according to one or more embodiments of the disclosure.
FIGS. 9A-9B illustrate example nano-structures for an example mixed reality system, manufactured according to one or more embodiments of the disclosure.

FIG. 8A illustrates an exemplary substrate 800A, according to embodiments of this disclosure. As shown in the figure, substrate 800A can include a base 802A and a plurality of nano-structures 804A. The exemplary substrate 800A may be a silicon substrate. The plurality of nano-structures 804A can form a pattern on the surface of the base 802A. As shown in the figure, the plurality of nano-structures 804A may be a lines and spaces pattern that can protrude from a surface of the base 802A. The pattern geometry is not intended to limit the scope of this disclosure and any suitable nano-pattern can be used, as discussed above, without departing from the scope of this disclosure. The plurality of nano-structures 804A may be associated with a first height (800h1) and a first width (800d1). In one or more examples, the nano-structures 804A can have a width 800d1 in a range of about 100-250 nm and a height 800h1 of about 70-150 nm. For example, 804A may have a width 800d1 of about 219 nm and height 800h1 of about 115 nm. These exemplary dimensions are provided for illustrative purposes and not intended to limit the scope of the disclosure.

FIG. 8B illustrates an exemplary etched substrate 800B that can be etched according to one or more embodiments of this disclosure. For example, substrate 800B may be produced by etching silicon substrate 800A using a base-water-acid-water ultrasonication process sequence according to one or more examples of this disclosure. As discussed above, a silicon substrate may have an etch rate of about 1-4 nm/min using a base-water-acid-water sequence. As shown in the figure, the etched nano-structure 804B may have a reduced line width 800d2 compared to the line width 800d1, and an increased height 800h2 compared to height 800h1. For example, nano-structures 804B may have a width 800d2 of about 114 nm and a height 800h2 of about 114 nm. Comparing the dimensions of nano-structures 804A to nano-structures 804B, the change in the width (800Δd) between 800d1 and 800d2 can be about-105 nm, while the change in height (800Δh) between 800h1 and 800h2 can be about −1 nm. These exemplary dimensions are provided for illustrative purposes and not intended to limit the scope of the disclosure. Similar to the example discussed above, the line width dimension d can be reduced to achieve a desired nano-structure geometry, while the height of the nano-structures can remain relatively consistent. Further, as shown in the figure, the LER of the nano-structures 804B can be smooth, particularly when compared to the LER associated with conventional lithography processes at the nano-scale.

FIG. 9A illustrates an exemplary substrate 900A, according to embodiments of this disclosure. As shown in the figure, substrate 600A can include a base 902A and a plurality of nano-structures 904A. The exemplary substrate 900A may be a silicon dioxide substrate. The plurality of nano-structures 904A can form a pattern on the surface of the base 902A. As shown in the figure, the plurality of nano-structures 904A may be a lines and spaces pattern that can protrude from a surface of the base 902A. The pattern geometry is not intended to limit the scope of this disclosure and any suitable nano-pattern can be used, as discussed above, without departing from the scope of this disclosure. The plurality of nano-structures 904A may be associated with a first height (900h1) and a first width (900d1). In one or more examples, the nano-structures 904A can have a width (900d1) in a range of about 100-250 nm and a height (900h1) of about 70-150 nm. For example, 904A may have a width, 900d1 of about 125 nm and height, 900h1 of about 123 nm. These exemplary dimensions are provided for illustrative purposes and not intended to limit the scope of the disclosure.

FIG. 9B illustrates an exemplary etched substrate 900B that can be etched according to one or more embodiments of this disclosure. For example, substrate 900B may be produced by etching silicon dioxide substrate 900A using a base-acid-water ultrasonication process sequence according to one or more examples of this disclosure. As discussed above, a silicon dioxide substrate may have an etch rate of about 0 nm/min using a base-water-acid-water sequence. As shown in the figure, the etched nano-structures 904B may have about the same dimensions as nano-structures 904A. For example, nano-structures 904B may have a width 900d2 of about 125 nm and a height 900h2 of about 123 nm. Comparing the dimensions of nano-structures 604A to nano-structures 604B, the change in the width (900Δd) between 900d1 and 900d2 can be about 0 nm, while the change in height (900Δh) between 900h1 and 900h2 can be about 0 nm. These exemplary dimensions are provided for illustrative purposes and not intended to limit the scope of the disclosure. In some examples, the LER of the nano-structures 904B can be smoother than the LER of nano-structures 904A.

FIG. 10A illustrates an exemplary substrate 1000A, according to embodiments of this disclosure. As shown in the figure, substrate 600A can include a base 1002A and a plurality of nano-structures 1004A. The exemplary substrate 1000A may be a silicon substrate. The plurality of nano-structures 1004A can form a pattern on the surface of the base 1002A. As shown in the figure, the plurality of nano-structures 1004A may be a lines and spaces pattern that can protrude from a surface of the base 1002A. The pattern geometry is not intended to limit the scope of this disclosure and any suitable nano-pattern can be used, as discussed above, without departing from the scope of this disclosure. The plurality of nano-structures 1004A may be associated with a first height 1000h1 and a first width 1000d1. In one or more examples, the nano-structures 1004A can have a width 1000d1 in a range of about 100-250 nm and a height 1000h1 in a range of about 70-150 nm. For example, 1004A may have a width 1000d1 of about 126 nm and height 1000h1 of about 130 nm. These exemplary dimensions are provided for illustrative purposes and not intended to limit the scope of the disclosure.

FIG. 10B illustrates an exemplary etched substrate 1000B that can be etched according to one or more embodiments of this disclosure. For example, substrate 1000B may be produced by etching silicon substrate 1000A using a base-water-acid-water ultrasonication process sequence according to one or more examples of this disclosure. As discussed above, a silicon substrate may have an etch rate of about 1-4 nm/min using a base-acid-water sequence. As shown in the figure, the etched substrate 1000B may have a reduced line width 1000d2 compared to the line width 1000d1, while the height can remain about the same (e.g., +5 nm). For example, 1004B may have a width 1000d2 of about 47 nm and a height 1000h2 of about 125 nm. Comparing the dimensions of nano-structures 1004A to nano-structures 1004B, the change in the width between 1000d1 and 1000d2 can be about-79 nm, while the change in height between 1000h1 and 1000h2 can be about −5 nm. These exemplary dimensions are provided for illustrative purposes and not intended to limit the scope of the disclosure. Similar to the example discussed above, the line width dimension d can be reduced to achieve a desired nano-structure geometry, while the height of the nano-structures can remain relatively consistent. Further, the LER of the nano-structures 1004B can be smooth, particularly when compared to the LER associated with conventional lithography processes at the nano-scale. While substrate 1000B was produced using a similar process sequence to substrate 800B, in some examples, the thinner line widths of substrate 1000B may be due to a change in one or more ultrasonication conditions, e.g., length of time exposed to ultrasonication, temperature of liquid bath, concentration of acid and/or base solution, etc.

Exemplary Multi-Tiered Nano-Patterns

As discussed above, different substrate materials (e.g., silicon and silicon dioxide) can be associated with consistent and/or predictable etch rates. Moreover, varying the ultra-sonication process sequences (e.g., base-acid-water (B-A-W), base-water-acid-water (B-W-A-W)) may provide different relative etch rates between the substrate materials. Thus, the differences in etch rates between these two materials can be leveraged to fabricate multi-tiered structures in a selective and controllable manner. For example, by adjusting the ultrasonication conditions, e.g., length of time of the ultrasonication bath, temperature, solution strength, and/or process sequence, the amount of material removed may be predetermined and/or controlled. Thus, multi-tiered nano-structures with a varying cross-sectional geometry can be achieved by exposing a substrate to a single set of ultra-sonication conditions. In some embodiments, various geometries, including, but not limited to stepped, re-entrant, and blazed can be achieved using fabrication processes according to embodiments of this disclosure.

Figures 11A, 11B, 11C:
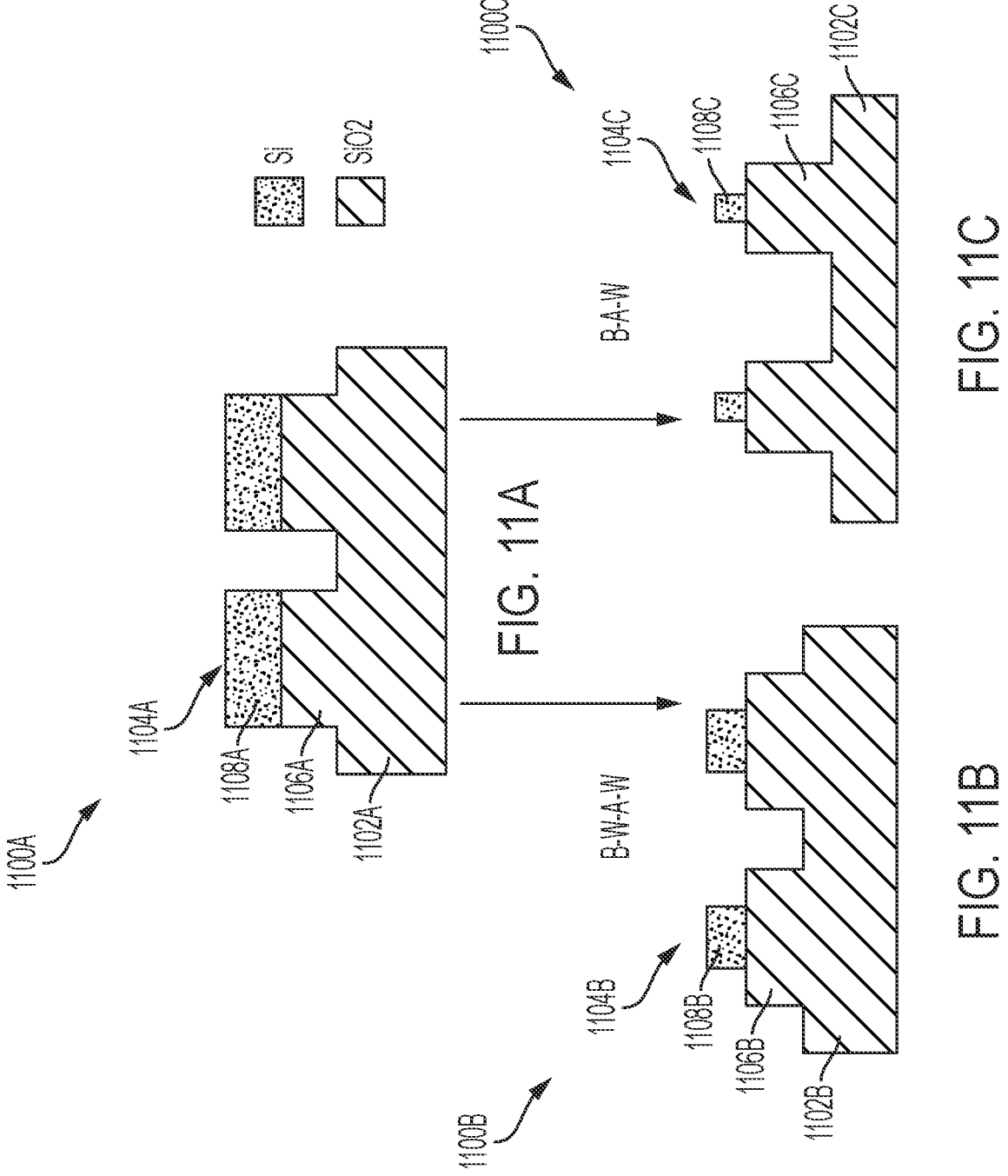
FIGS. 11A-11C illustrates example nano-structures for an example mixed reality system, according to one or more embodiments of the disclosure.
Figures 13A, 13B, 13C, 13D, 13E:
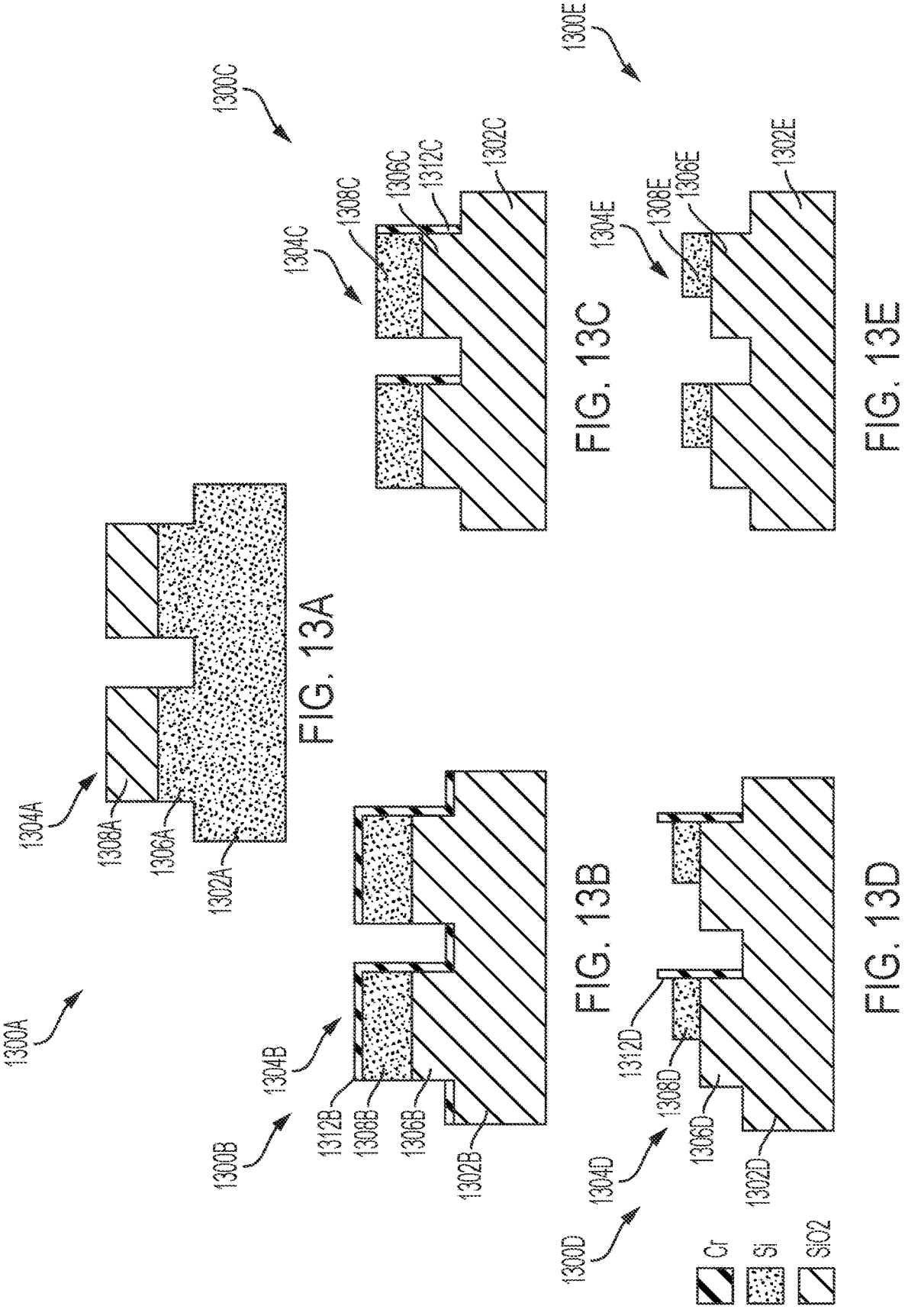
FIGS. 13A-13E illustrates example nano-structures for an example mixed reality system, according to one or more embodiments of the disclosure.

FIGS. 11A-11C, 12A-12C, and 13A-13E illustrate exemplary multi-tiered substrates at various stages in the ultrasonication fabrication process according to embodiments of this disclosure. For example, FIGS. 11B and 11C illustrate exemplary substrates with a stepped geometry, fabricated according to embodiments of this disclosure. FIGS. 12B and 12C illustrate exemplary substrates with a re-entrant geometry, fabricated according to embodiments of this disclosure. FIG. 13E illustrates an exemplary substrate with a blazed geometry, fabricated according to embodiments of this disclosure. The exemplary multi-tiered structures can be formed from one or more layers of silicon-based materials, including for example, but not limited to silicon, silicon dioxide, silicon nitride, and/or other silicon-based materials. As shown in the figures, and discussed in greater detail below, the grating geometry, e.g., stepped geometry, re-entrant geometry, and blazed geometry, can be achieved by leveraging the different etch rates of the different materials.

FIGS. 11A-11C illustrate exemplary multi-tiered substrates at various stages in ultrasonication fabrication processes according to embodiments of this disclosure. For example, FIG. 11A illustrates multi-tiered substrate 1100A prior to the ultrasonication process. As shown in the figure, the multi-tiered substrate 1100A can include a base 1102A and a plurality of nano-structures 1104A. Each of the plurality of nano-structures 1104A can include a first layer 1106A disposed on the base 1102A and a second layer 1108A disposed on the first layer 1106A. As shown in the figure, both the first layer 1106A and the second layer 1108A can have the same width. In some embodiments, the base 1102A and the first layer 1106A can be formed from silicon dioxide, and the second layer 1108A can be formed from silicon. In some embodiments, the first and second layers can be deposited using lithography techniques.

As discussed above, silicon and silicon dioxide can be associated with different etch rates. For example, silicon can be associated with a greater etch rate than silicon dioxide. For instance, as discussed above, a base-water-acid-water process sequence may provide an etch rate of about 1-4 nm for silicon and an etch rate of about 0 nm for silicon dioxide. Thus, with reference to substrate 1100A, using silicon dioxide for the base 1102A and first layer 1106A and silicon for the second layer 1108A, may result in a stepped geometry due to the relatively high etch rate of silicon compared to silicon dioxide.

FIG. 11B illustrates stepped substrate 1100B, fabricated according to embodiments of this disclosure by, for example, applying a base-water-acid-water process sequence to substrate 1100A. As shown in the figure, the stepped substrate 1100B can include a base 1102B and a plurality of nano-structures 1104B. Each nano-structure 1104B can include a first layer 1106B of silicon dioxide and a second layer 1108B of silicon. As shown in the figure, substrate 1100B can have a stepped geometry where a width or diameter of the second layer 1108B can be different from a width or diameter of the first layer 1106B. This difference in the widths between the first layer 1106B and the second layer 1108B can be attributed to the relative differences in etch rates of silicon and silicon dioxide during the ultrasonication process sequence. For instance, as discussed above, a base-water-acid-water process sequence may provide an etch rate of about 1-4 nm for silicon and an etch rate of about 0 nm for silicon dioxide. These exemplary etch rates are consistent with the geometry of substrate 1100B compared to substrate 1100A, where the second layer 1108B, has a smaller width than second layer 110A; and the base 1102B and first layer 1106B have dimensions that are about the same as base 1102A and first layer 1106A.

FIG. 11C illustrates stepped substrate 1100C, fabricated according to embodiments of this disclosure by, for example, applying a base-acid-water process sequence to substrate 1100A. As illustrated in FIG. 11C, the substrate 1100C can include a base 1102C of silicon dioxide and one or more nano-structures 1104C. Each nano-structure 1104C can include a first layer 1106C of silicon dioxide and a second layer 1108B of silicon. As shown in the figure, substrate 1100C can have a stepped geometry where a width or diameter of the second layer 1108C can be different from a width of the first layer 1106C. This difference in the widths between the first layer 1106B and the second layer 1108C can be attributed to the relative differences in etch rates of silicon and silicon dioxide during the ultrasonication process sequence. For instance, as discussed above, a base-acid-water process sequence may provide an etch rate of about 1-4 nm for silicon and an etch rate of about 0.2-0.7 nm for silicon dioxide. These exemplary etch rates are consistent with the geometry of substrate 1100C compared to substrate 1100A, where the second layer 1108C, has a smaller width than second layer 1108A; the base 1102C has a smaller height than base 1102A; and the first layer 1106C as a smaller width than first layer 1106A.

Additionally, referring to both substrates 1100B and 1100C, because ultrasonication provides a substantially uniform reactive environment across the surface of the substrate, the stepped nano-structures 1104C can be centered, for example, such that each of the nano-structures 1104C can have a symmetric cross-section. Such alignment of nano-structures using conventional lithography techniques, in comparison, can be difficult and expensive to achieve due to the nano-scale of the structures.

As discussed above, substrates 1100B and 1100C are illustrative of the impact of applying different process sequences to a template substrate. A comparison of exemplary substrates 1100B and 1100C illustrates this difference. For instance, silicon dioxide is associated with a higher etch rate for the base-acid-water-process sequence applied to substrate 1100C, than the base-water-acid-water process sequence applied to substrate 1100B. Thus, as shown in the figures, first layer 1106C can have a smaller width than first layer 1106B. Similarly, the height associated with the base 1102C can be shorter than the height associated with base 1102B. Accordingly, different process sequences can be used to achieve different etched substrate geometries and dimensions.

FIGS. 12A-12C illustrate exemplary multi-tiered substrates at various stages in ultrasonication fabrication processes according to embodiments of this disclosure. FIG. 12A illustrates multi-tiered substrate 1100A prior to the ultrasonication process. As shown in the figure, the multi-tiered substrate 1200A can include a base 1202A and a plurality of nano-structures 1204A. Each of the plurality of nano-structures 1104A can include a first layer 1206A disposed on the base 1202A and a second layer 1208A disposed on the first layer 1206A. As shown in the figure, both the first layer 1206A and the second layer 1208A can have the same width. In some embodiments, the base 1202A and the second layer 1208A can be formed from silicon, and the first layer 1106A can be formed from silicon dioxide.

As discussed above, silicon and silicon dioxide can be associated with different etch rates. For example, silicon can be associated with a greater etch rate than silicon dioxide. Thus, with reference to substrate 1200A, using silicon for the base 1202A and second layer 1208A and silicon dioxide for the first layer 1206A, may result in a re-entrant geometry due to the relatively high etch rate of silicon compared to silicon dioxide. Nano-structures having a re-entrant geometry can be used in light trapping applications such as in color selective waveguides and/or solar cells.

FIG. 12B illustrates a re-entrant substrate 1200B, fabricated according to embodiments of this disclosure by, for example, applying a base-water-acid-water process sequence to substrate 1200A. As shown in the figure, the stepped substrate 1200B can include a base 1202B and a plurality of nano-structures 1204B. Each nano-structure 1204B can include a first layer 1206B of silicon, a second layer 1208B of silicon dioxide, and a third layer 1210B of silicon. As shown in the figure, the third layer 1210B, may disposed on the base 1202B, the first layer 1206B can be disposed on the third layer 1210B, and the second layer 1208B can be disposed on the first layer. As shown in the figure, substrate 1200B can have a re-entrant geometry where a width for each layer, e.g., the first layer 1206B, second layer 1208B, and third layer 1210B, can differ. For example, the first layer 1206B can be wider than the second and third layers 1208B, 1210B. In some examples, the third layer 1210B can be wider than the second layer 1208B.

The difference between the widths of the first layer 1206B, second layer 1208B, and third layer 1210B can be attributed to the relative differences in etch rates of silicon and silicon dioxide during the ultrasonication process sequence. For instance, as discussed above, a base-water-acid-water process sequence may provide an etch rate of about 1-4 nm for silicon and an etch rate of about 0 nm for silicon dioxide. These exemplary etch rates are consistent with the geometry of substrate 1200B compared to substrate 1200A. For example, the silicon dioxide first layer 1206B may have dimensions that are about the same as first layer 1206A. In contrast, the silicon second layer 1208A can have a smaller width than second layer 1208A. Moreover, the silicon third layer 1210B can be etched from the base 1202A. For instance, during the etching process sequence material can be removed from the silicon base 1202A and form the third layer 1210B beneath the first layer 1206A. Accordingly, base 1202B can be shorter than base 1202A.

FIG. 12C illustrates a re-entrant substrate 1200C, fabricated according to embodiments of this disclosure by, for example, applying a base-acid-water process sequence to substrate 1200A. As illustrated in FIG. 12C, the substrate 1200C can include a base 1202C of silicon and one or more nano-structures 1204C. Each nano-structure 1204C can include a first layer 1206C of silicon, a second layer 1208C of silicon dioxide, and a third layer 1210C of silicon. As shown in the figure, the third layer 1210C, may disposed on the base 1202C, the first layer 1206C can be disposed on the third layer 1210C, and the second layer 1208C can be disposed on the first layer. As shown in the figure, substrate 1200C can have a re-entrant geometry where a width for each layer, e.g., the first layer 1206C, second layer 1208C, and third layer 1210C, can differ. For example, the first layer 1206C can be wider than the second and third layers 1208C, 1210C. In some examples, the third layer 1210C can be wider than the second layer 1208C.

The difference between the widths of the first layer 1206C, second layer 1208C, and third layer 1210C can be attributed to the relative differences in etch rates of silicon and silicon dioxide during the ultrasonication process sequence. For instance, as discussed above, a base-acid-water process sequence may provide an etch rate of about 1-4 nm for silicon and an etch rate of about 0.2-0.7 nm for silicon dioxide. These exemplary etch rates are consistent with the geometry of substrate 1200C compared to substrates 1200A and 1200C. For example, each of the first and second layers 1206C and 1208C can have a smaller width than the first and second layers 1206A and 1208A. Moreover, the silicon dioxide first layer 1206C may have dimensions, e.g., width and height, that are smaller than first layer 1206B. As discussed above with respect to third layer 1210B, the silicon third layer 1210C can be etched from the base 1202A. For instance, during the etching process sequence material can be removed from the silicon base 1202A and form the third layer 1210C beneath the first layer 1206A. Accordingly, base 1202C can be shorter than base 1202A.

Additionally, referring to both substrates 1200B and 1200C, because ultrasonication provides a substantially uniform reactive environment across the surface of the substrate, the stepped nano-structures 1204C can be centered, for example, such that each of the nano-structures 1204C can have a symmetric cross-section. Such centering of nano-structures using conventional lithography techniques, in comparison, can be difficult and expensive to achieve due to the scale of the structures. Further, ultrasonication can provide a smooth LER and reduce the incidence of line-breaks compared to conventional lithography techniques.

As discussed above, substrates 1200B and 1200C are illustrative of the impact of applying different process sequences to a template substrate. For instance, silicon dioxide is associated with a higher etch rate for the base-acid-water-process sequence applied to substrate 1200C, than the base-water-acid-water process sequence applied to substrate 1200B. Thus, as shown in the figures, first layer 1206C can have a smaller width than first layer 1206B. Similarly, the height associated with the base 1202C can be shorter than the height associated with base 1202B. Accordingly, different process sequences can be used to achieve different etched substrate geometries and dimensions.

FIGS. 13A-13E illustrate exemplary multi-tiered substrates at various stages during an ultrasonication fabrication process according to embodiments of this disclosure. FIG. 13A illustrates multi-tiered substrate 1300A prior to the ultrasonication process. As shown in the figure, the multi-tiered substrate 1300A can include a base 1302A and a plurality of nano-structures 1304A. Each of the plurality of nano-structures 1304A can include a first layer 1306A disposed on the base 1302A and a second layer 1308A disposed on the first layer 1306A. As shown in the figure, both the first layer 1306A and the second layer 1308A can have the same width. In some embodiments, the base 1302A and the first layer 1306A can be formed from silicon dioxide, and the second layer 1108A can be formed from silicon. As discussed above, silicon and silicon dioxide can be associated with different etch rates. For example, silicon can be associated with a greater etch rate than silicon dioxide. Thus, with reference to substrate 1300A, using silicon dioxide for the base 1302A and first layer 1306A and silicon for the second layer 1308A, may result in a the first layer having a lower etch rate than the second layer.

FIG. 13E illustrates an exemplary substrate 1300E with a blazed geometry, fabricated according to embodiments of this disclosure. In one or more embodiments, substrate 1300E can be fabricated with the ultrasonication sequence processes according to examples of this disclosure, e.g., a base-water-acid-water sequence process and/or a base-acid-water sequence process. As shown in the figure, the blazed geometry can include a first layer 1306 E disposed on a base 1302E and a second layer 1308E disposed on the first layer 1306E. For example, the first layer can be formed from silicon dioxide and the second layer can be formed from silicon. As shown in the figure, while the first layer 1306E may be wider than the second layer 1308E, at least one side of the first layer 1306E and the second layer 1308E can be aligned to form the asymmetric blazed structure.

FIGS. 13B-13D illustrate exemplary substrates 1300B-1300D, demonstrating the intermediate steps during the fabrication of substrate 1300E. As shown in these figures, a mask 1312B-1312D can be disposed on one or more surfaces of the substrate. The mask 1312B-1312D can be formed from a material that is not reactive with the acid and base solutions used during the ultrasonication sequence processes. In some embodiments, the mask can be a chrome mask, but other materials can be used without departing from the scope of this disclosure. Accordingly, during ultrasonication, masked substrate surfaces may not be etched, while masked substrate surfaces can be etched to produce the asymmetric blazed geometry.

Exemplary Ultrasonication Process Sequences

FIG. 14 illustrates an example block diagram directed to a process 1400 for fabricating a multi-tiered structure according to embodiments of this disclosure. For example, process 1400 can be directed to the steps for fabricating the multi-tiered substrates, e.g., substrates 1100B, 1200B, and 1300D, using a base-water-acid-water process sequence. While the following steps associated with process 1400 may be described with respect to FIGS. 11A-11B, this is not intended to be limiting and this process can be associated with other substrates, e.g., 600B, 700B, 700C.

In one or more embodiments, a substrate, e.g., substrate 1100A, can be deposited and submerged in a bath, e.g., liquid bath 506, of a base solution and sound waves can be applied to the bath to perform ultrasonication (step 1402). For example, a transducer, e.g., 502, can be applied to the bath, e.g., 506, to perform ultrasonication. As discussed above, the base solution can react with a surface of the substrate. Additionally, the applied sound waves can agitate the base solution such that reacted molecules can be continually removed and the surface of the substrate can be continually replenished with unreacted base solution. In one or more examples, submerging the substrate in the base solution can prime the substrate surface for reacting with subsequent solutions, e.g., the acid solution, but not result in removal of material, e.g., a reduction of dimensions of one or more nano-structures. For example, the base solution can lower the energy barrier and weaken bonds between molecules located at or near the substrate surface. In some embodiments, after a predetermined amount of time, the substrate can be removed from the bath of the base solution (step 1404). The amount of time can be based on, for example, a desired geometry for the fabricated structure and the etch rates of the substrate material for given ultrasonication conditions, e.g., temperature, base solution concentration, etc.

In some embodiments, the substrate can be submerged in a bath of water and ultrasonication can be applied to the bath (step 1406). As discussed above, the water can react with the silicon and silicon dioxide present at the surface of the substrate. As discussed above, the ultrasonication of the water bath can continually provide a reactive environment at the surface of the substrate. In some embodiments, after a predetermined amount of time, the substrate can be removed from the water bath (step 1408). In some embodiments, the amount of time can be based on, for example, a desired geometry for the fabricated structure and the etch rates of the substrate material for given ultrasonication conditions, e.g., temperature, acid and base solution concentration, etc.

In some embodiments, the substrate can be submerged in a bath of an acid solution and ultrasonication can be applied to the bath (step 1410). In some embodiments, the acid solution can react with the silicon and silicon dioxide present at the surface of the substrate such that a predetermined volume of material can be removed based on a length of time ultrasonication is applied to the substrate. As discussed above, the ultrasonication of the water bath can continually provide a reactive environment at the surface of the substrate. In some embodiments, after a predetermined amount of time, the substrate can be removed from the bath of the acid solution (step 1412). In some embodiments, the volume of material removed can be based on one or more ultrasonication conditions including, but not limited to, the temperature, acid and base solution concentration, and time exposed to the solution. In some embodiments, the amount of time can be based on, for example, a desired geometry for the fabricated structure and the etch rates of the substrate material for given ultrasonication conditions, e.g., temperature, acid solution concentration, etc.

In some embodiments, the substrate can be submerged in a bath of water and ultrasonication can be applied to the bath (step 1414). In some examples, the water can remove reactant, residue, and/or debris from the surface of the substrate. In some examples, the water can provide a clean surface free from reactants. As discussed, the ultrasonication of the water bath can continually provide a reactive environment at the surface of the substrate. In some embodiments, after a predetermined amount of time, the substrate can be removed from the water bath (step 1416). In some embodiments, the substrate removed from the bath at step 1416 can correspond to substrate 600B, 700B, 700C, 1100B, 1200B, and/or substrate 1300D.

Figure 15:
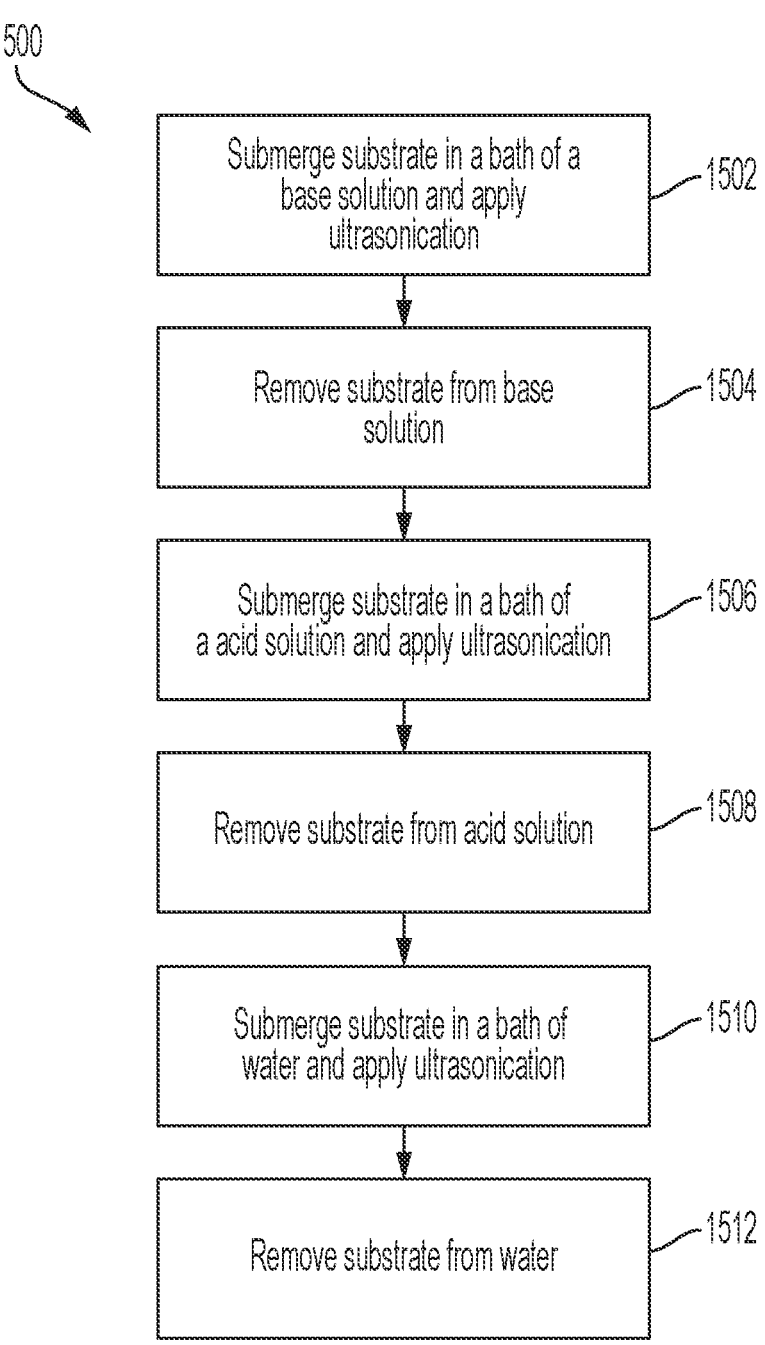
FIG. 15 illustrates an example block diagram of a process for manufacturing nano-structures for an example mixed reality system, according to one or more embodiments of the disclosure.

FIG. 15 illustrates an example block diagram directed to a process 1500 for fabricating a multi-tiered structure according to embodiments of this disclosure. For example, process 1500 can be directed to the steps for fabricating the multi-tiered substrates, e.g., substrates 1100C, 1200C, and 1300D, using a base-acid-water process sequence. While the following steps associated with process 1500 may be described with respect to FIGS. 11A and 11C, this is not intended to be limiting and this process can be associated with other substrates, e.g., 800B, 900B, 1000B, 1200C and 1300D.

In one or more embodiments, a substrate, e.g., substrate 1100A, can be submerged in a bath, e.g., liquid bath 506, of a base solution and sound waves can be applied to the bath to perform ultrasonication (step 1502). Step 1502 may be similar to step 1402 described above. In some embodiments, after a predetermined amount of time, the substrate can be removed from the bath of the base solution (step 1504). The amount of time can be based on, for example, a desired geometry for the fabricated structure and the etch rates of the substrate material for given ultrasonication conditions, e.g., temperature, base solution concentration, etc.

In some embodiments, the substrate can be submerged in a bath of an acid solution and ultrasonication can be applied to the bath (step 1506). Step 1506 may be similar to step 1410 described above. In some embodiments, after a predetermined amount of time, the substrate can be removed from the bath of the acid solution (step 1508). In some embodiments, the amount of time can be based on, for example, a desired geometry for the fabricated structure and the etch rates of the substrate material for given ultrasonication conditions, e.g., temperature, acid solution concentration, etc.

In some embodiments, the substrate can be submerged in a bath of water and ultrasonication can be applied to the bath (step 1510). Step 1510 may be similar to step 1414 described above. In some embodiments, after a predetermined amount of time, the substrate can be removed from the water bath (step 1512). In some embodiments, the substrate removed from the bath at step 1412 can correspond to substrate 1100C, substrate 1200C, and/or substrate 1300D.

Accordingly, ultrasonication process sequences can be used to etch substrates to form nano-structures suitable for optical gratings according to embodiments of this disclosure. Such ultrasonication techniques can reduce one or more dimensions of an initial substrate in a controlled manner, e.g., based on known etch rates for different materials to achieve a desired geometry and/or dimensions for one or more nano-structures. Moreover, because ultrasonication can provide a substantially uniform reactive environment across the surface of the substrate, the stepped nano-structures 1104C can be centered, for example, such that each of the nano-structures 1104C can have a symmetric cross-section. Such alignment of nano-structures using conventional lithography techniques, in comparison, can be difficult and expensive to achieve due to the scale of the structures. Finally the ultrasonication sequence processes according to embodiments of this disclosure can provide smooth LER without line breaks.

Figure 16:
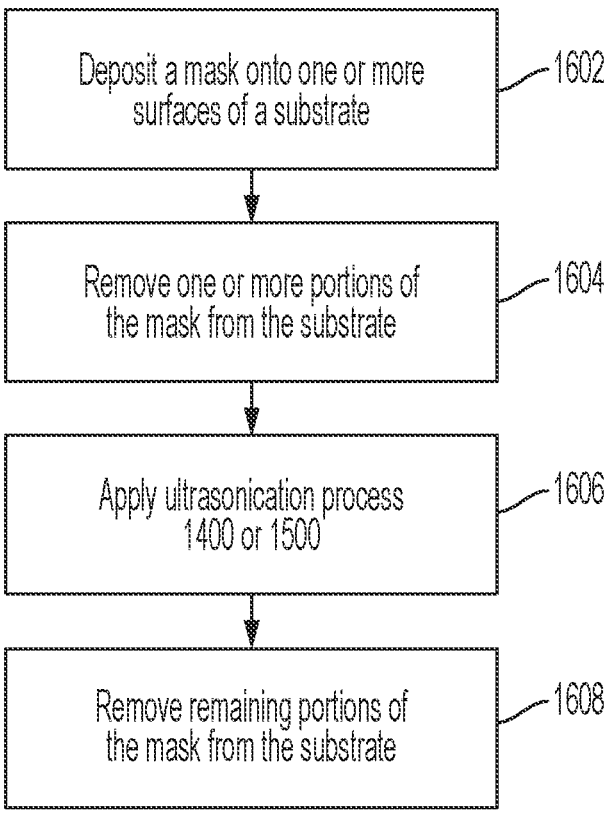
FIG. 16 illustrates an example block diagram of a process for manufacturing nano-structures for an example mixed reality system, according to one or more embodiments of the disclosure.

Embodiments according to this disclosure can also provide methods for fabricating substrates with asymmetric cross-sectional geometries. For example, FIG. 16 illustrates an example block diagram directed to a process 1600 for fabricating a multi-tiered structures, e.g., multi-tiered blazed structures, according to embodiments of this disclosure. For example, process 1600 can be directed to the steps for fabricating a blazed multi-tiered substrates, e.g., 1300E.

In one or more embodiments, a mask can be applied to one or more surfaces of a substrate (step 1602). For example, FIG. 13B illustrates an exemplary substrate 1300B where a mask 1312B has been applied to a surface of the substrate. As shown in the figure, the mask can be applied at an angle such that one or more surfaces of the substrate 1300B, but not all of the surfaces, have a mask 1312B disposed thereon. In some examples, the mask can include a glancing angle deposition (GLAD) mask and/or protective material using physical vapor deposition such a E-beam. The E-beam process can evaporate one or more metal or inorganic material, e.g., chrome (Cr), titanium (Ti), nickel (Ni), silicon dioxide (SiO2), titanium dioxide (TiO2), aluminum oxide (Al2O3), etc., to ensure stable adhesion of the deposited material to the coated surface. During the GLAD process the substrate can be angled with respect to the source of the mask material, thereby creating a shadow in the deposition path over the nano-pattern on the surface of the substrate. In one or more embodiments, the mask can be a chrome mask. In one or more embodiments, the mask can be formed from a material that is resistant to the selected acid and base solutions used during the ultrasonication process sequences described above.

In one or more embodiments, one or more portions of the mask can be removed (step 1604). For example, FIG. 13C illustrates an exemplary substrate 1300C where one or more portions of a mask has been removed such that mask 1312C remains on the surface of the substrate. The one or more portions of a mask, e.g., mask 1312B can be removed via a dry etching process. For example, plasma and/or reactive gases such as fluorocarbons, oxygen, chlorine, and/or boron trichloride can be used to remove portions of the mask. In some examples, the dry etching can be antistrophic such that portions of the mask disposed on horizontal substrate surfaces are removed, while portions of the mask on vertical substrate surfaces remain. In some examples, other antistrophic mask removing processes can be used. As shown in the figure, following step 1604, the remaining mask 1312C can be disposed along the right vertical side of nano-structure 1304C.

In one or more embodiments, the ultrasonication processes described above, e.g., ultrasonication process 1400 and/or ultrasonication process 1500 can be applied to the substrate (step 1606). For instance, a base-water-acid-water ultrasonication process and/or a base-acid-water ultrasonication process can be applied to the substrate, e.g., substrate 1300C. FIG. 13D illustrates an exemplary substrate 1300D, after the ultrasonication process has been applied. As shown in the figure, the ultrasonication process can remove material from one or more layers of the nano-structures 1304D. For example, material can be removed from the silicon second layer 1308D. As shown in the figure, the mask 1312D disposed along the right edge of the nano-structure 1304D may prevent removal of material from the right edge of the nano-structure 1304D during ultrasonication. Accordingly, use of the mask 1312D can prevent removal of material from the masked surface of the substrate during ultrasonication to produce an asymmetric blazed structure.

In one or more embodiments, the remaining mask, e.g., mask 1312D, can be removed from the substrate, e.g., 1300D (step 1608). In some embodiments, the mask can be removed using a wet etching process. For example, the substrate, e.g., substrate 1300D, can be submerged in a solution configured to etch the mask, e.g., 1312D, without reacting and/or removing substrate material, e.g., silicon and silicon dioxide. FIG. 13E illustrates an exemplary blazed substrate 1300E that can be produced by process 1600.

Disclosed herein are systems and methods for fabricating nano-structures on a substrate. The substrate including a plurality of nano-structures can be used in eyepieces for displays, such as for a head wearable device. An example method for fabricating and/or etching a substrate including a plurality of nano-structures for an eyepiece can include submerging the substrate in a bath and applying ultrasonication to the bath for a first time period. The ultrasonication applied to the first bath can agitate the fluid to provide a substantially uniform first reactive environment across the surface of the substrate. Embodiments disclosed herein may provide a robust and easy to manufacture display system that can provide consistent digital image quality during use. The substrate can be submerged in a second bath and ultrasonication can be applied to the second bath for a second time period. The ultrasonication applied to the second bath can agitate the fluid to provide a substantially uniform second reactive environment across the surface of the substrate. In some examples, a predetermined amount of material can be removed from the surface of the substrate during the second time period to produce an etched substrate. In some examples, the predetermined amount of material removed can be based on a length of the first time period and further on a length of the second time period.

In one or more examples, the process for fabricating nano-structures on a substrate can include depositing a mask onto one or more surfaces of the substrate, and removing one or more portions of the mask from the substrate. In some examples, at least a portion of the surface of the substrate is masked during the etching.

In one or more examples, the predetermined amount of material can be uniformly removed from the surface of the substrate such that a cross-section of the plurality of nanostructures of the etched substrate can be symmetric. In one or more examples, a thickness of the predetermined amount of material removed from the surface can be in a range of about 5-50 nm.

In one or more examples, the substrate can include a base comprising a first material. The nano-structures of the plurality of nano-structures can be disposed on the base, the nano-structures can include a first layer. In some examples, the first layer can include a second material, different from the first material. In some examples, the nano-structures can have a substantially uniform width. In some examples, the base can be associated with a first etch rate for a first set of ultrasonication conditions; and the first layer can be associated with a second etch rate for the first set of ultrasonication conditions. In one or more examples, the substrate can be formed from at least one selected from silicon, silicon dioxide, and silicon nitride. In one or more examples, the acid solution can comprise approximately a 2% concentration of sulfuric acid in water. In one or more examples, the base solution comprises approximately a 2% concentration of hydrogen peroxide or potassium hydroxide in water.

In one or more examples, each nano-structure of the plurality of nano-structures can have a geometry corresponding to one selected from a stepped geometry, a re-entrant geometry, and a blazed geometry. In one or more examples, The ultrasonication conditions can include one or more of a temperature associated with one or more of the first bath and second bath, the length of time associated with the first time period, the length of time associated with the second time period, a concentration of the acid solution, and a concentration of the base solution.

A compound according to embodiments of this disclosure can include a substrate including a base having a first surface and a plurality of nano-structures disposed on the first surface. In some examples, the substrate can be configured to be etched by applying an ultrasonication process sequence to the substrate to form an etched substrate. In some examples, the etched substrate can include a plurality of etched nano-structures, where the plurality of etched nano-structures can be fabricated by removing a first predetermined amount of material from the first surface and further removing a second predetermined amount of material from one or more surfaces of the plurality of nano-structures.

In one or more examples, a thickness of the predetermined amount of material removed from the surface of the substrate can be in a range of about 5-50 nm. In one or more examples, the predetermined amount of material can be uniformly removed from the first surface and the one or more surfaces of the plurality of nano-structures such that a cross-section of the plurality of etched nano-structures of the etched substrate can be symmetric.

In one or more examples, the ultrasonication process sequence can include submerging the substrate in a first bath, where the first bath comprises a first fluid and applying ultrasonication to the first bath for a first time period, where applying ultrasonication agitates the first fluid to provide a substantially uniform first reactive environment across the surface of the substrate. In some examples, the ultrasonication process sequence can include submerging the substrate in a second bath, where the second bath comprises a second fluid, and applying ultrasonication to the second bath for a second time period, where applying ultrasonication agitates the second fluid to provide a substantially uniform second reactive environment across the surface of the substrate. In one or more examples, the predetermined amount of material can be removed during the second time period to produce an etched substrate. In one or more examples, the amount of predetermined amount of material can be based on a length of the first time period and further on a length of the second time period. In one or more examples, The ultrasonication conditions can include one or more of a temperature associated with one or more of the first bath and second bath, the length of time associated with the first time period, the length of time associated with the second time period, a concentration of the acid solution, and a concentration of the base solution.

In one or more examples, the base of the substrate can comprise a first material and the nano-structure of the plurality of nano-structures can form a first layer, wherein the first layer comprises a second material, different from the first material. In one or more examples, the base can be associated with a first etch rate for a first set of ultrasonication conditions and the first layer can be associated with a second etch rate for the first set of ultrasonication conditions. In one or more examples, the substrate can be formed from at least one selected from silicon, silicon dioxide, and silicon nitride. In one or more examples, the acid solution can comprise approximately a 2% concentration of sulfuric acid in water. In one or more examples, the base solution comprises approximately a 2% concentration of hydrogen peroxide or potassium hydroxide in water.

In one or more examples, each nano-structure of the plurality of nano-structures has a substantially uniform width. In one or more examples, each etched nano-structure of the plurality of nano-structures can have a geometry corresponding to one selected from a stepped geometry, a re-entrant geometry, and a blazed geometry.

Although the disclosed examples have been fully described with reference to the accompanying drawings, it is to be noted that various changes and modifications will become apparent to those skilled in the art. For example, elements and/or components illustrated in the drawings may be not be to scale and/or may be emphasized for explanatory purposes. As another example, elements of one or more implementations may be combined, deleted, modified, or supplemented to form further implementations. Other combinations and modifications are to be understood as being included within the scope of the disclosed examples as defined by the appended claims.

The invention claimed is:

1. A method of etching a substrate including a plurality of nano-structures, the method comprising:
    submerging the substrate in a first bath, the first bath comprising a first fluid;
    applying ultrasonication to the first bath for a first time period, wherein applying ultrasonication agitates the first fluid to provide a substantially uniform first reactive environment across a surface of the substrate;
    submerging the substrate in a second bath, the second bath comprising a second fluid; and
    applying ultrasonication to the second bath for a second time period, wherein applying ultrasonication agitates the second fluid to provide a substantially uniform second reactive environment across the surface of the substrate, wherein a predetermined amount of material is removed from the surface of the substrate during the second time period to produce an etched substrate, and wherein a thickness of the predetermined amount of material removed from the surface is in a range of 5-50 nm,
    wherein the amount of material is predetermined based on a length of the first time period and based further on a length of the second time period.

2. The method of claim 1, wherein the predetermined amount of material is uniformly removed from the surface of the substrate such that a cross-section of the plurality of nano-structures of the etched substrate is symmetric.

3. The method of claim 1, wherein:
    the substrate comprises a base comprising a first material;
    the nano-structures of the plurality of nano-structures are disposed on the base, the nano-structures comprising a first layer, the first layer comprising a second material different from the first material,
    the nano-structures of the plurality of nano-structures have a substantially uniform width, and
    the base is associated with a first etch rate for a first set of ultrasonication conditions and the first layer is associated with a second etch rate for the first set of ultrasonication conditions.

4. The method of claim 3, wherein each nano-structure of the plurality of nano-structures has a geometry corresponding to one of a stepped geometry, a re-entrant geometry, and a blazed geometry.

5. The method of claim 3, wherein the ultrasonication conditions of the first set of ultrasonication conditions include one or more of:
    a temperature associated with one or more of the first bath and the second bath, the first bath comprising a base solution and the second bath comprising an acid solution,
    the length of time associated with the first time period,
    the length of time associated with the second time period,
    a concentration of the acid solution, and
    a concentration of the base solution.

6. The method of claim 1, wherein the substrate is formed from at least one of silicon, silicon dioxide, and silicon nitride.

7. The method of claim 1, wherein the second fluid is an acid solution, wherein the acid solution comprises approximately a 2% concentration of sulfuric acid in water.

8. The method of claim 1, wherein the first fluid is a base solution, wherein the base solution comprises approximately a 2% concentration of hydrogen peroxide or potassium hydroxide in water.

9. The method of claim 1, further comprising:
    depositing a mask onto one or more surfaces of the substrate; and
    removing one or more portions of the mask from the substrate, wherein at least a portion of the surface of the substrate is masked during the second time period.

10. A compound comprising:
    a substrate comprising:
        a base comprising a first surface; and
        a plurality of nano-structures disposed on the first surface,
    wherein the substrate is configured to be etched by applying an ultrasonication process sequence to the substrate to form an etched substrate, the etched substrate comprising a plurality of etched nano-structures, and
    wherein the etched nano-structures are fabricated by removing a first predetermined amount of material from the first surface and further by removing a second predetermined amount of material from one or more surfaces of the plurality of nano-structures, and wherein a thickness of the first predetermined amount of material removed from the first surface is in a range of 5-50 nm.

11. The compound of claim 10, wherein the predetermined amount of material is uniformly removed from the first surface and further is uniformly removed from the one or more surfaces of the plurality of nano-structures such that a cross-section of the plurality of etched nano-structures of the etched substrate is symmetric.

12. The compound of claim 10, wherein the ultrasonication process sequence comprises:

submerging the substrate in a first bath, the first bath comprising a first fluid;

applying ultrasonication to the first bath for a first time period, wherein applying ultrasonication agitates the first fluid to provide a substantially uniform first reactive environment across the first surface of the substrate;

submerging the substrate in a second bath, the second bath comprising a second fluid; and applying ultrasonication to the second bath for a second time period, wherein applying ultrasonication agitates the second fluid to provide a substantially uniform second reactive environment across the first surface of the substrate, and wherein the predetermined amount of material is removed during the second time period to produce an etched substrate, wherein the amount of material is predetermined based on a length of the first time period and based further on a length of the second time period.

13. The compound of claim 12, wherein:

the base comprises a first material, the nano-structures of the plurality of nano-structures comprises a first layer, the first layer comprising a second material different from the first material, the base is associated with a first etch rate for a first set of ultrasonication conditions, and the first layer is associated with a second etch rate for the first set of ultrasonication conditions.

14. The compound of claim 13, wherein each nano-structure of the plurality of nano-structures has a substantially uniform width, and wherein each etched nano-structure of the plurality of nano-structures has a geometry corresponding to one of a stepped geometry, a re-entrant geometry, and a blazed geometry.

15. The compound of claim 13, wherein the ultrasonication conditions of the first set of ultrasonication conditions include one or more of:

a temperature associated with one or more of the first bath and second bath, the first bath comprising a base solution and the second bath comprising an acid solution, the length of time associated with the first time period, the length of time associated with the second time period, a concentration of the acid solution, and a concentration of the base solution.

16. The compound of claim 12, wherein the second fluid is an acid solution, wherein the acid solution comprises approximately a 2% concentration of sulfuric acid in water.

17. The compound of claim 12, wherein the first fluid is a base solution, wherein the base solution comprises approximately a 2% concentration of hydrogen peroxide or potassium hydroxide in water.

18. The compound of claim 10, wherein the substrate is formed from at least one of silicon, silicon dioxide, and silicon nitride.

* * * * *